(12) United States Patent
Fredriksson et al.

(10) Patent No.: US 6,985,724 B2
(45) Date of Patent: Jan. 10, 2006

(54) DEVICE FOR TRANSMITTING DATA AND CONTROL COMMANDS VIA RADIO CONNECTIONS IN A DISTRIBUTED CONTROL SYSTEM FOR ONE OR MORE MACHINES AND/OR PROCESSES

(75) Inventors: Lars-Berno Fredriksson, Kinna (SE); Kent Lennartsson, Bjorketorp (SE)

(73) Assignee: Kvaser Consultant AB, Kinna (SE)

( * ) Notice: Subject to any disclaimer, the term of this patent is extended or adjusted under 35 U.S.C. 154(b) by 171 days.

(21) Appl. No.: 10/239,763

(22) PCT Filed: Feb. 27, 2001

(86) PCT No.: PCT/SE01/00423

§ 371 (c)(1),
(2), (4) Date: Jan. 13, 2003

(87) PCT Pub. No.: WO01/76148

PCT Pub. Date: Oct. 11, 2001

(65) Prior Publication Data

US 2004/0047473 A1    Mar. 11, 2004

(30) Foreign Application Priority Data

Mar. 31, 2000    (SE) .................................. 0001148

(51) Int. Cl.
*H04Q 7/20*      (2006.01)
*H04B 15/00*     (2006.01)
*H04B 7/212*     (2006.01)
*H04J 3/00*      (2006.01)

(52) U.S. Cl. .................. 455/426.1; 455/502; 370/347; 370/337; 370/345

(58) Field of Classification Search ................ 455/564, 455/435, 426.1, 525, 502, 523, 14; 370/479, 370/449, 338, 224, 468, 348, 419, 347, 337, 370/345; 398/154
See application file for complete search history.

(56) References Cited

U.S. PATENT DOCUMENTS

| | | | | | |
|---|---|---|---|---|---|
| 4,737,949 | A | * | 4/1988 | Yamamoto | 370/479 |
| 5,359,595 | A | * | 10/1994 | Weddle et al. | 370/468 |
| 5,434,861 | A | * | 7/1995 | Pritty et al. | 370/449 |
| 5,469,428 | A | * | 11/1995 | Tokura et al. | 370/224 |

(Continued)

OTHER PUBLICATIONS

Carlos M.J. Alves-Serodio et al., An Integrated Network for Agricultural Management Applications, IEEE, 1998, pp. 679-683.

*Primary Examiner*—William Trost
*Assistant Examiner*—Kiet Doan
(74) *Attorney, Agent, or Firm*—Connolly Bove Lodge & Hutz LLP; Larry J. Hume

(57) ABSTRACT

In a distributed control system for one or more machines and/or one or more processes, data and control commands are transmitted via radio connections between nodes in the control system. The nodes operate with radio transmitters and radio receivers and comprise or are controlled by activation devices for activating their transmission and receiver functions. The nodes also operate with time-determination devices which comprise or control the abovementioned activation devices. The time-determination devices are arranged to determine the transmission or reception position of the nodes by means of the activation devices and allocated settings or controls. The abovementioned settings or controls can be determined by means of one or more schedules implemented in or for the control system, in which the nodes are given unique or co-ordinated transmission and reception times on the radio connections.

23 Claims, 26 Drawing Sheets

| NODE | LOCAL VARIABLE | SYSTEM VARIABLE | TRANSMIT TIME | RECEPTION TIME |
|---|---|---|---|---|
| A | TEMPERATURE | INLET TEMPERATURE | 0, 20, 40, 60, 80 | |
| B | INLET TEMPERATURE | IN HEAT EXCHANGER | | 0, 20, 40, 60, 80 |
| C | TEMPERATURE | OUTLET TEMPERATURE | 1, 21, 41, 61, 81 | |
| B | OUTLET TEMPERATURE | IN HEAT EXCHANGER | | 1, 21, 41, 61, 81 |

U.S. PATENT DOCUMENTS

| | | | |
|---|---|---|---|
| 5,845,201 A * | 12/1998 | Funke et al. | 455/403 |
| 5,956,331 A * | 9/1999 | Rautiola et al. | 370/338 |
| 5,995,512 A * | 11/1999 | Pogue, Jr. | 370/419 |
| 6,236,485 B1 * | 5/2001 | Lucek | 398/154 |
| 6,385,465 B1 * | 5/2002 | Yoshioka | 455/564 |
| 6,553,020 B1 * | 4/2003 | Hughes et al. | 370/347 |
| 6,622,022 B1 * | 9/2003 | Du | 455/502 |
| 6,628,636 B1 * | 9/2003 | Young | 370/337 |
| 6,628,640 B1 * | 9/2003 | Sugaya | 370/348 |
| 6,912,212 B1 * | 6/2005 | Young et al. | 370/337 |
| 2001/0012776 A1 * | 8/2001 | Chandler et al. | 455/435 |
| 2003/0156569 A1 * | 8/2003 | Kawakami et al. | 370/345 |

\* cited by examiner

| NODE | LOCAL VARIABLE | SYSTEM VARIABLE | TRANSMIT TIME | RECEPTION TIME |
|---|---|---|---|---|
| A | TEMPERATURE | INLET TEMPERATURE | 0, 20, 40, 60, 80 | |
| B | INLET TEMPERATURE | IN HEAT EXCHANGER | | 0, 20, 40, 60, 80 |
| C | TEMPERATURE | OUTLET TEMPERATURE | 1, 21, 41, 61, 81 | |
| B | OUTLET TEMPERATURE | IN HEAT EXCHANGER | | 1, 21, 41, 61, 81 |

| Time<br>Node | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| a | T20 | R | R | R | R | R | R | R | R | R | R | R | R | R | R |
| b | R | T20 | R | R | R | R | R | R | R | R | R | R | R | R | R |
| c A1 | R | R | T20 | R | R | R | R | R | R | R | R | R | R | R | R |
| c A2 | R | R | R | T20 | R | R | R | R | R | R | R | R | R | R | R |
| d | R | R | R | R | T20 | R | R | R | R | R | R | R | R | R | R |
| e A1 | R | R | R | R | R | T20 | R | R | R | R | R | R | R | R | R |
| e A2 | R | R | R | R | R | R | T20 | R | R | R | R | R | R | R | R |
| f | R | R | R | R | R | R | R | T20 | R | R | R | R | R | R | R |
| g A1 | R | R | R | R | R | R | R | R | T20 | R | R | R | R | R | R |
| g A2 | R | R | R | R | R | R | R | R | R | T20 | R | R | R | R | R |
| h | R | R | R | R | R | R | R | R | R | R | T20 | R | R | R | R |
| i | R | R | R | R | R | R | R | R | R | R | R | T20 | R | R | R |
| j A1 | R | R | R | R | R | R | R | R | R | R | R | R | T20 | R | R |
| j A2 | R | R | R | R | R | R | R | R | R | R | R | R | R | T20 | R |
| k | R | R | R | R | R | R | R | R | R | R | R | R | R | R | T20 |

A1 = antenna 1
A2 = antenna 2

Fig 8

DEVICE FOR TRANSMITTING DATA AND CONTROL COMMANDS VIA RADIO CONNECTIONS IN A DISTRIBUTED CONTROL SYSTEM FOR ONE OR MORE MACHINES AND/OR PROCESSES

This invention concerns a device for transmitting data and control commands via radio connections between nodes in a distributed control system for one or more machines and/or one or more processes. The use of so-called distributed control systems for controlling machines and processes is known in connection with previous distributed control systems. Such systems are commonly known as field buses and examples of such field buses are Profibus, Fieldbus Foundation, Control Net, etc, which are used for large systems and Device Net, CAN KINGDOM, etc, which are used for smaller systems and are based on Controller Area Network, which are often called CAN buses. Common to these systems is that they are based on cable communication. The use of radio communication in connection with systems of this kind is also known, and in this connection reference is made to the international patent application by the same applicant as this patent application with the number PTC/SE97/00211. See also EP 610999, WO 8807794 and U.S. Pat. No. 5,235,631.

The disadvantages of cable communication in this connection are that the laying of the cables is responsible for a considerable part of the investment and that there is a great susceptibility to cable breakages. In addition the functions are susceptible to electrical potential differences which can be static, for example in connection with high voltage installations, or dynamic, for example in connection with lightning strikes. Efforts are therefore being made to find effective wireless solutions, which among other things are radio based. However, with known devices, arrangements and methods there are great problems in utilizing known radio technology which is developed for communication between persons and machines where the connections are connected and disconnected as required. In other words the radio network has to provide a service to the nodes which are in the system. Such a method and use in this connection results in a great need for traffic overhead while at the same time the real-time characteristics of the system are poor. This invention aims, among other things, to solve this problem.

In accordance with the concept of the invention the radio receivers and radio transmitters in the system must be able to operate with transmission powers which are controlled dynamically as required, while at the same time the signal traffic must be able to be changed instantaneously in all or parts of the plant. It is also important to be able to utilize the available bandwidth effectively and to be able to control the transmission powers as functions of the user-time arrangement. Antenna propagation lobes must be able to be constant or vary as a function of the user times in question. The invention also solves this problem.

In various connections it is necessary for effective utilization of the system to utilize relay functions in the same. There is also a need to be able to combine radio communication principles with the known cable arrangements and in this connection it is essential to be able to reduce the error frequency to a magnitude which is of the order of that which applies for systems with the abovementioned cable connections. The invention also solves this problem.

This invention is based among other things on the utilization of the fact that the traffic and the units and nodes therein must be able to be scheduled manually or automatically within the system. In a preferred embodiment the system must be able to operate with both fixed and movable nodes and the scheduling must be able to comply with a number of nodes or units which varies with time. The invention is also intended to solve this problem.

It is principally characteristic of a device according to the invention that the nodes mentioned in the introduction operate as radio transmitters and/or radio receivers or operate with such transmitters and/or receivers. In a preferred embodiment most and preferably all the nodes comprise both radio transmitters and radio receivers. The nodes comprise or are controlled by some form of activation function which in this case is achieved by some form of activation device. The activation function or functions bring about one or more activations of the transmitter or receiver functions. In accordance with the invention the nodes also operate with a time-determination function which can be achieved by some form of time-determination device and can be incorporated in the abovementioned activation device and/or control this. The time-determination function or functions are arranged to determine the transmission or reception position of the nodes in the system by means of one or more activation functions and allocated settings or controls. The abovementioned settings or controls can be determined by means of one or more schedules implemented in or for the control system, in which the node or nodes are given unique, alternating or combined co-ordinated transmission and reception times on the radio connections.

In an embodiment of the concept of the invention the respective node can comprise a connection device or devices which can be incorporated in the above-mentioned activation function or activation device. At the node's commencing or scheduled transmission time or reception time the abovementioned connection function will connect the node to an appropriate radio connection. The node's transmitter or receiver transmits or receives thereby only representative data or representative control command(s) for the node which refer to the machine or process concerned. In this way identification and address data and any sorting data are omitted, which can reduce the transmission or reception time within the system and thereby save bandwidth. In a preferred embodiment the nodes belonging to a certain geographical area operate with a common time base. The system thereby operates with a time slot arrangement for the exchange of data or control commands between the nodes and each node is allocated its own time slots or time slots in the system. Thereby the first and second time slots can be used for the transmission of data and control commands respectively. In addition the nodes in an embodiment can use a number of different types of message, for example a first type of message which is intended for internal processing or forwarding to and/or receiving from equipment or information concerning the node. A second type of message for transmission and/or reception can be used for transmission over fixed connections in the system.

In a preferred embodiment one or more of the abovementioned nodes are arranged to effect control of the transmission power in the respective nodes concerned as a function of timing selected or set up in the system, called here common time or global time. The respective antenna lobe concerned can thereby be controlled in accordance with a particular pattern depending on the common or global time, that is the propagation and/or direction of the lobe can be varied with time.

The scheduling within the system can be carried out from a central unit within the system. This central unit can consist of a node or alternatively the unit can be part of a node. The scheduling can be carried out initially, and for a system with a varying number of nodes, fixed nodes, movable nodes, etc, the scheduling can be updated automatically or manually as appropriate. In one embodiment transmission and reception frequencies which concern the node are distributed within the system to the respective node. Thus, for example, a first node with transmission to a second node located within the node's coverage area transmits with a signal strength which provides a reception signal at the second node which exceeds the interference level be a predetermined value. Additional nodes which are located within the coverage area of the first node and which are not affected by the signalling between the first node and the second node can disregard the signalling in question or can be deactivated for transmission (and possibly reception). With the abovementioned scheduling the additional nodes which are not involved in a particular signalling can measure and record the signal strength from the first node. These measured and recorded signal strengths can be used in the time scheduling within the system. Nodes which are located within a geographical coverage area concerned can form two or more first and second nodes operating in parallel depending on the established signal strengths and the coverage areas. Other nodes which are located outside the coverage area of the first node during the period or periods of time concerned can record a lack of reception signal or a received signal with interference. These records can also be incorporated in the scheduling for optimal bandwidth utilization.

In an embodiment in the case when a first node transmits to a second node and one or more additional nodes are located within the coverage area or areas of the first node, the additional node or nodes can be arranged to establish control of the connection between the first node and the second node(s). In the event of the connection between the first node concerned and the second node concerned being broken or having interference, one or more of the additional nodes can act as one or more relay stations and thereby take over the connection which has been broken or has interference. Such a taking over of the connection between the first node and the second node by means of one or more relay station nodes is specified or incorporated in the system's general scheduling. In the event of two arrangements working in parallel with first and second nodes within one and the same geographical coverage area, the node in one arrangement can temporarily change its coverage area in order to exchange data or control commands with a second node in the other first node's coverage area, etc. In the case of relaying nodes, these forward data or control commands only with the knowledge that the data, control command or message received during a certain period of time is to be forwarded during a certain subsequent period of time in accordance with the scheduling of the behaviour of the node.

In a preferred embodiment a global time is used for this which is zeroed at regular intervals, so-called circular timing. In this preferred embodiment the nodes operate with internal clocks and one of the system's nodes is selected to determine the setting of the clocks in the other nodes by means of time-synchronization messages exchanged in the system in the form of digital signals. The clocks in the respective nodes read off the respective time-synchronization messages preferably at a predetermined offset. The selected node commences the time transmission in the system and attaches the time, for example at the predetermined offset at the start of the time message. Other nodes' clocks can thereby synchronize themselves with the time of the selected node by deducting any deviations. The system thereafter relates to the common or global time thus established. In the determination of the common time from the abovementioned selected node other nodes preferably take into account the delay of the data or control command from the selected node. The respective node can compare subsequent time messages from the selected node and depending on the comparison can correct or adjust its clock with respect to deviations in the time.

In a preferred embodiment the system is arranged for position determination of movable nodes. The respective movable nodes can thereby be allocated a place in the schedule before their entry into the system. The respective movable nodes signal to one or more schedule-monitoring or scheduling nodes either directly or via relaying nodes. Upon entry into the system the movable node synchronizes its clock with the common global time, after which the movable node, preferably while stationary, listens to on-going traffic and records reception times for messages, signal strengths, etc. The movable node can report times and signal strengths to the scheduling node, which can estimate the position of the respective movable node by comparing the signals and signal strengths obtained with other scheduled signalling in the time and propagation diagram. The accuracy of the estimation of the geographical position of the respective movable node can be increased with an increased number of nodes which the movable node detects and/or with the length of the listening time. The estimate of the geographical position is improved if the schedule is prepared for movable nodes and if a number of fixed nodes are instructed to listen for the respective movable node. The latter can be provided with a movement-detecting unit in combination with a calculation unit which calculates the relative movement of the movable node. The basic information can also comprise knowledge of the geography of the site.

A scheduling node can operate with a propagation diagram for a particular area in which the node in question is preferably centrally positioned. The node can thereby commence transmission at a maximum power in accordance with a selected protocol. Other fixed nodes located in the area adopt the listening position and the scheduling node transmits a number of time-stamped messages at the abovementioned maximum power so that the other nodes can synchronize themselves with its clock in order to establish a common global time. Thereafter the scheduling node can transmit a transmission and/or reception schedule to other nodes within the geographical area. The scheduling node thereafter repeats its behaviour at a lower power, and so on.

For scheduling of a movable node this can be given a measurement schedule which allows it to transmit continuously for a certain period of time. An exact position of the starting point is established and the position can be calculated using gyro data or similar data. The movable node's clock is synchronized at the starting point with the common time or global time. Several control points are used within the area and the message in the movable node gives the output power, time and position. All fixed nodes in the system listen to and record messages which concern the specified position, and the signal strength of the movable node is estimated by compiling the results. The movable node receives on-going traffic, records the times and signal strengths of the received messages and its own position. By compiling the results the movable node can estimate with what signal strength the different nodes can be received. As the scheduling is based on a predetermined signal pattern, the known positions of the fixed nodes and the calculated positions of the movable nodes, the system can operate with messages which lack information about the identity of the sender or information about the content of the messages.

This makes it possible for normal traffic to need to use only values, as all other information is known in advance.

By means of what is proposed above it is possible to schedule in advance all the connections within a system in time and to distribute to each node in the system the parts of the schedule which concern that particular node. The distributed parts can also contain information which does not directly concern that particular node but which is essential at system level in order to safeguard the system's integrity and function. A common, virtual or real clock can be utilized in the system. Each node can be provided with a local clock function which can either be adjusted to run in synchronization with the common clock or alternatively the local time can be converted to and from the common time. In accordance with this invention the clock and time functions can consist of essentially known solutions, which is advantageous from the point of view of construction. By means of what is proposed above, radio apparatus which is adapted for the free ISM bands, for example the 2.45 GHz or 5.8 GHz band, can be used. By allocating each message a particular time slot when it is to be transmitted and received there is no need for addresses. The transmitting unit transmits a value at the time according to the schedule and the receiving unit listens for the value at the same time. In one embodiment all the nodes can transmit and receive messages from each other. At system level each variable is then allocated unique time slots for transmission. The transmission times are selected in accordance with the real-time requirements of the system. When the schedule for the whole system has been drawn up, each node is programmed so that the transmission and reception times for the node are in accordance with the system schedule. Then, for example, a fixed schedule can be distributed. In order to safeguard the function of the system more advanced scheduling can be used. A node in the system can thereby be allocated a system-monitoring function and there can be facilities for transmitting new schedules to the different nodes via the system messages. From one point in the system the respective schedules can be modified so that new nodes can be added or removed. Signal paths can be changed in the event of interference or faults. In addition transmission powers can be controlled dynamically as required and the schedule can be modified as required. In this way the system can be utilized optimally in different operating conditions, including in exceptional conditions which can be foreseen, for example fire in parts of the plant, pipe breakage, loss of pressure, etc. Each node can store several schedules and the signal traffic can be changed instantaneously in all or parts of the plant or the system by means of a system command. As the invention makes possible the control of the coverage area of each node, many opportunities arise to utilize the available bandwidth effectively. It is thus possible to set up a common time base and time for all the nodes within a particular geographical area. Each node can be allocated time slots for signalling. Each node can be allocated time slots for the reception of messages. Different types of message can be set up, for example types of messages for internal processing, messages for forwarding via radio, messages for forwarding via cable, etc. The transmission powers can be controlled in the nodes' function by the common time. The antenna propagation lobes of the nodes can be controlled constantly or as a function of the common time. Transmission and reception schedules for all nodes in the system can be drawn up and the parts of the schedule which concern the respective nodes can be distributed.

DESCRIPTION OF THE FIGURES

A currently proposed embodiment of a device which has the characteristics of the invention will be described below with reference to the attached figures, in which FIG. 8 shows in table form the scheduling of the nodes according to FIG. 6.

FIG. 1 shows three nodes A, B and C in the left column. In this case node A has the task of measuring one and only one temperature. The temperature can be a system variable and thus the temperature can concern an inlet temperature in a heat exchanger. In accordance with this invention node A is allocated transmission times in so-called time slots, where in this case node A has been allocated transmission times in the time slots 0, 20, 40, 60 and 80. In this case node A does not have to receive any data or commands and therefore has not been allocated any reception time or times. Node B is to receive the inlet temperatures in question from node A. Node B has therefore been allocated reception times which correspond to the transmission times for node A, that is the time slots 0, 20, 40, 60 and 80. Node B has no transmission times. Node C is to transmit a temperature, which can consist of a system variable in the form of an outlet temperature in the heat exchanger. Node C has been allocated the transmission times or transmission slots 1, 21, 41, 61, 81 for the temperatures in question. Node C does not have to receive any information and therefore has no reception times. Node B, however, has also to be able to record the outlet temperature from node C and has therefore been allocated the time slots 1, 21, 41, 61, 81 for reception of this temperature. These slots correspond to the transmission times or transmission slots for node C. It is thus sufficient for node A to define only the variable "temperature". In the system this temperature is "the inlet temperature in the heat exchanger". In this example the receiving node needs for its calculations the variables "inlet temperature" and "outlet temperature". The global clock or the time is circular and runs from 0 to 99 units of time per cycle.

Figures 1, 2:
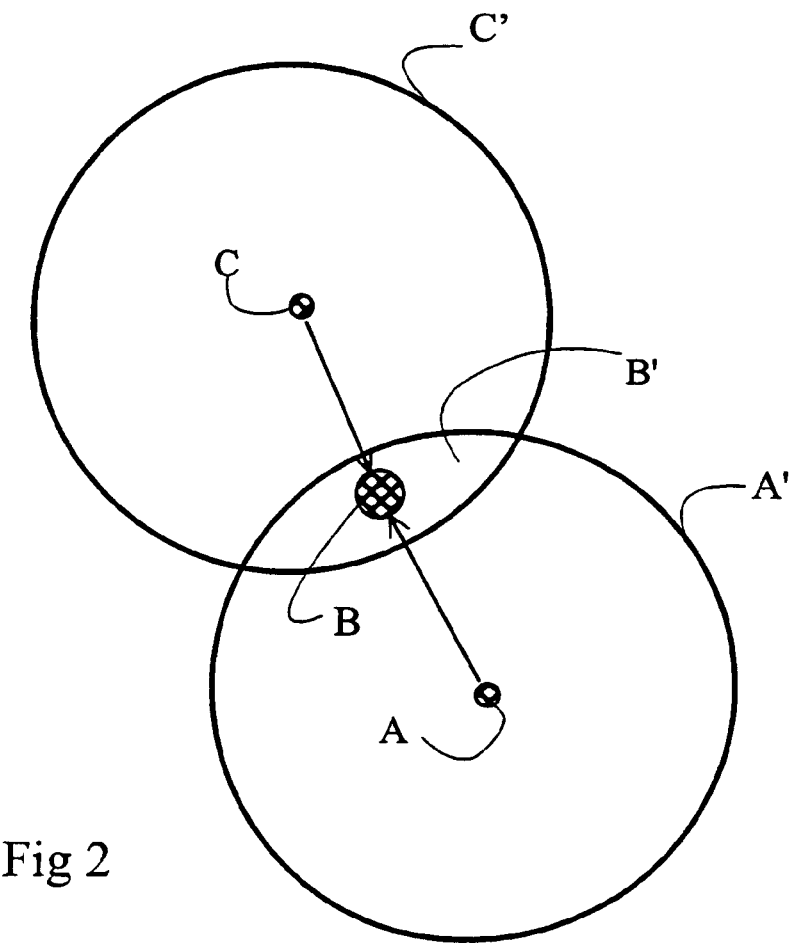
FIG. 1 shows a schedule for the transmission and reception times for different nodes.
FIG. 2 shows in outline diagram form the coverage areas of different nodes.

As can be seen from the above example and from FIG. 2 node B therefore does not need to know where a message is coming from and nor does the message need to contain information about which variable it concerns. This information is to be found in the schedule described below. The inlet temperature is the value which arrives at the time 0 and the associated outlet temperature arrives at the time 1 and thereafter the calculation work can commence in node B. At the time 20 the next inlet temperature arrives and the corresponding outlet temperature at the time 21. Node B must be able to detect the nodes A and C, but A and C do not need to be able to detect each other. This means that node A can operate with a coverage area A' and node C can operate with a coverage area C', which coverage areas include node B which thus lies within the common coverage area B'.

Figure 3:
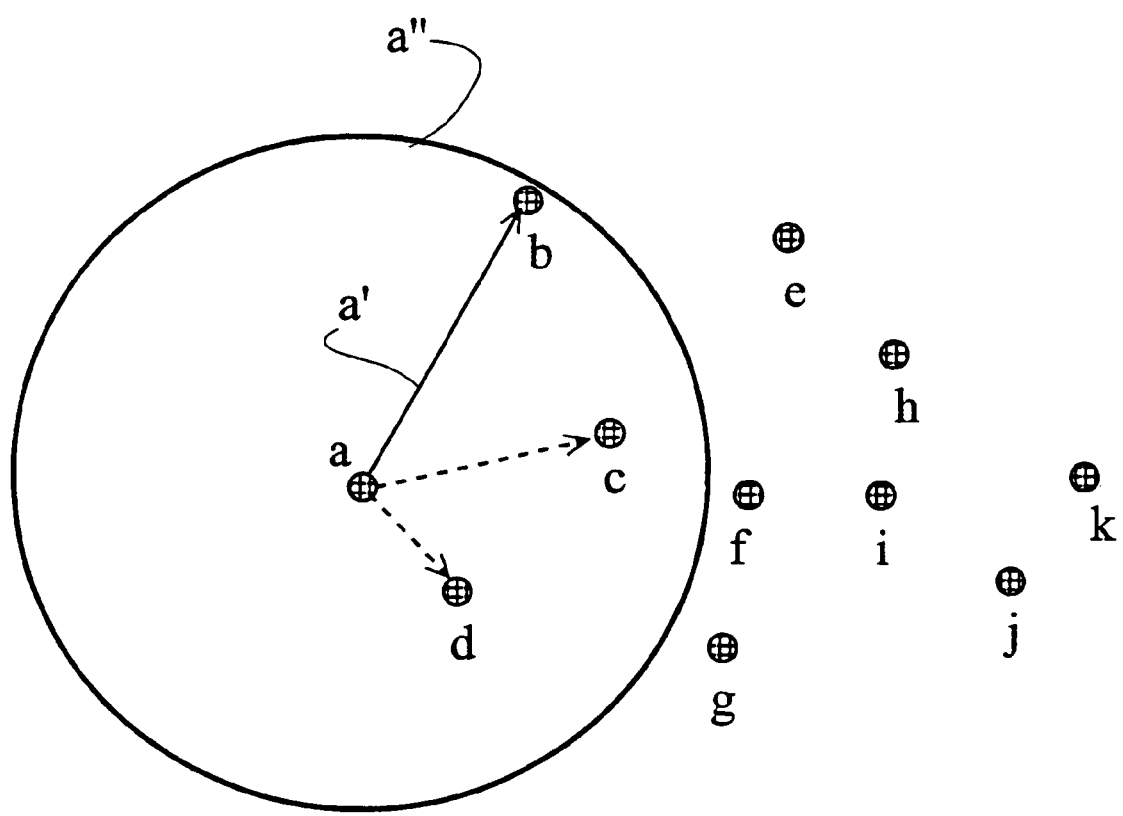
FIG. 3 illustrates in outline diagram form a number of nodes and the coverage area of one of these nodes.

In the embodiment according to FIG. 3 a number of nodes are shown which are designated a, b, . . . k. Node a is to transmit a message a' to node b at a certain time. Node a adjusts its output power so that node b can receive the radio signal a' from a. The coverage area of node a is indicated by a". As a rule of thumb it is the case in a preferred embodiment that the received signal must be at least 10 dM above the interference level. The circle a" thus indicates the range of node a. Node b receives the message, as do nodes c and d. Nodes c and d are silent during the transmission by node a in order not to interfere with its transmission. As the content in the message does not concern them, the signalling is of no interest to nodes c and d, but the signal strength of the message can be of interest for the scheduling of the whole system described below. Therefore nodes c and d can be instructed to measure and calculate the signal strength in order later to be able to send this to a unit in the system which has the task of planning and monitoring the scheduling of the traffic in the system.

Other nodes, that is nodes e–k, do not receive the message from node a and therefore traffic between them can take place in parallel.

Figure 4:
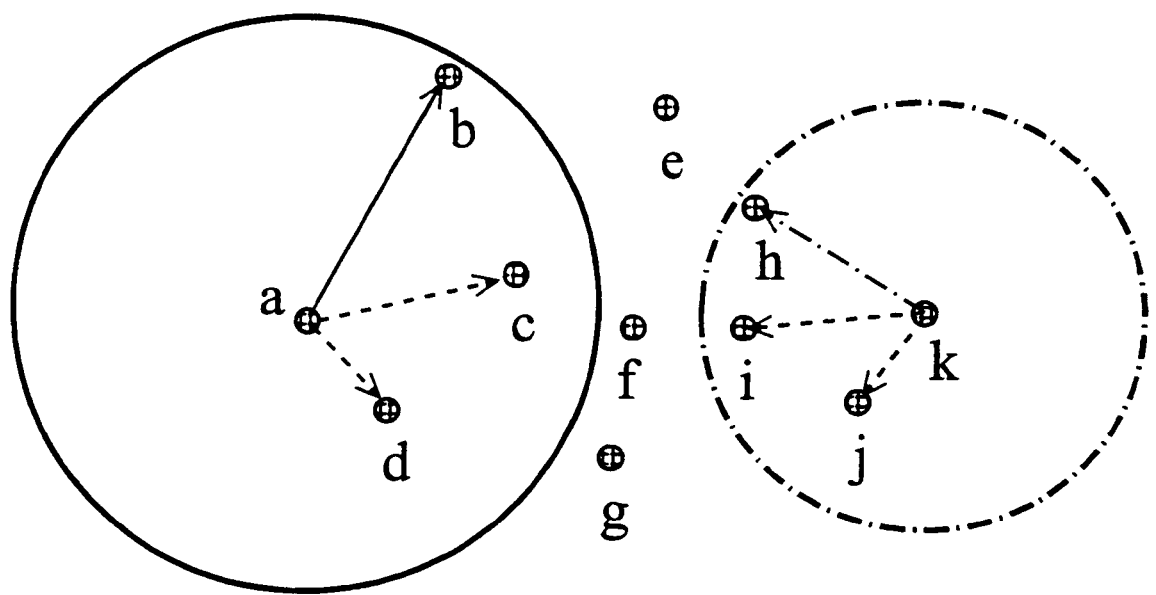
FIG. 4 illustrates how nodes with different coverage areas can be established within one and the same geographical area.

FIG. 4 shows how a node k transmits a message to a node h at the same time as node a is transmitting to node b. Nodes i and j also detect the message from node k in the same way as nodes c and d detect the message from node a, while nodes e, f and g do not detect any traffic. From the point of view of scheduling and monitoring, the information that nodes e, f and g do not detect the message is also of importance. By in this way instructing all the nodes that are not transmitting information to measure the signal strength at one and the same time and then report this, the scheduler and scheduling unit can optimize the utilization of the bandwidth.

Figure 5:
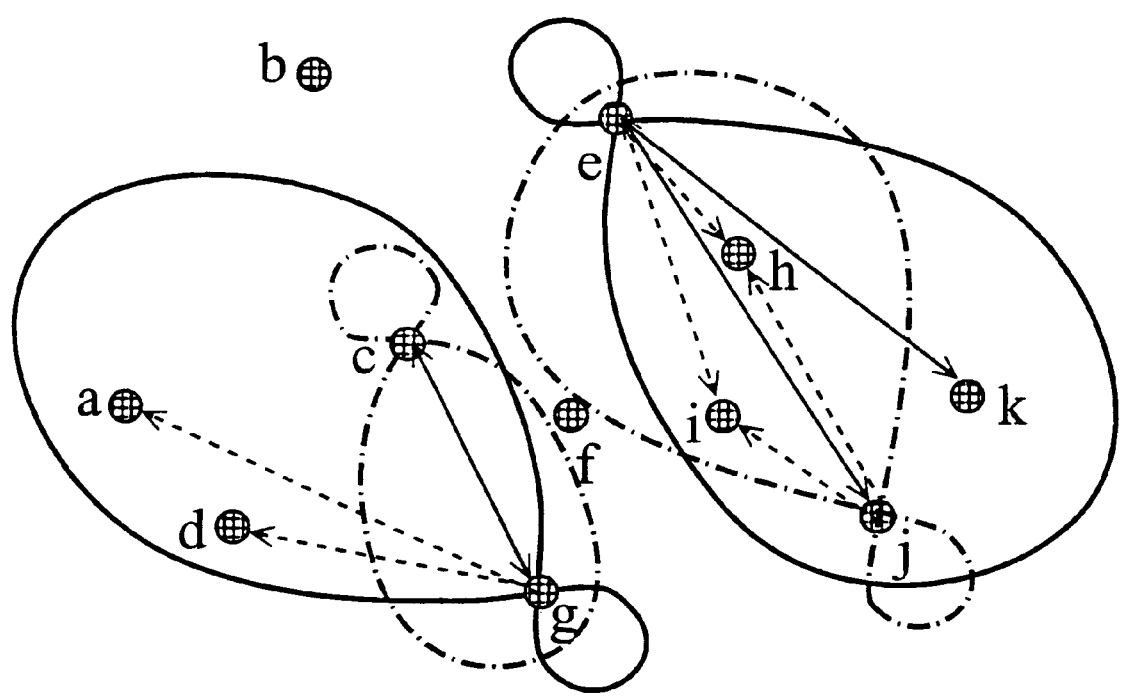
FIG. 5 illustrates nodes with different coverage areas achieved by means of, among other things, directional antennas.

The antenna lobes at a node can be given different arrangements. One way is to arrange the antenna as a directional antenna. FIG. 5 shows how nodes c and g and nodes e and j are provided with directional antennas. Nodes c and g and nodes e and j can now exchange messages with each other in parallel. Nodes a and d can detect node g and nodes i and h can detect both nodes e and j. Nodes b and f cannot detect any of the signalling nodes, and so on. If, for example, nodes b and c were not scheduled these could be caused to believe that the bandwidth was available for them and could start signalling, which could easily result in the ongoing signalling being subject to interference. By means of an overall scheduling of the system as described below such interference is prevented. As nodes i and h detect the communication from both the nodes e and j they can be used to monitor that the communication between them is functioning. If for any reason nodes e or j cannot at a certain time cover each other due to a temporary reduction in range, the nodes i or h could be used as relay stations in order to solve the problem locally. The scheduling of the system must be prepared for such a backup procedure.

Figure 6:
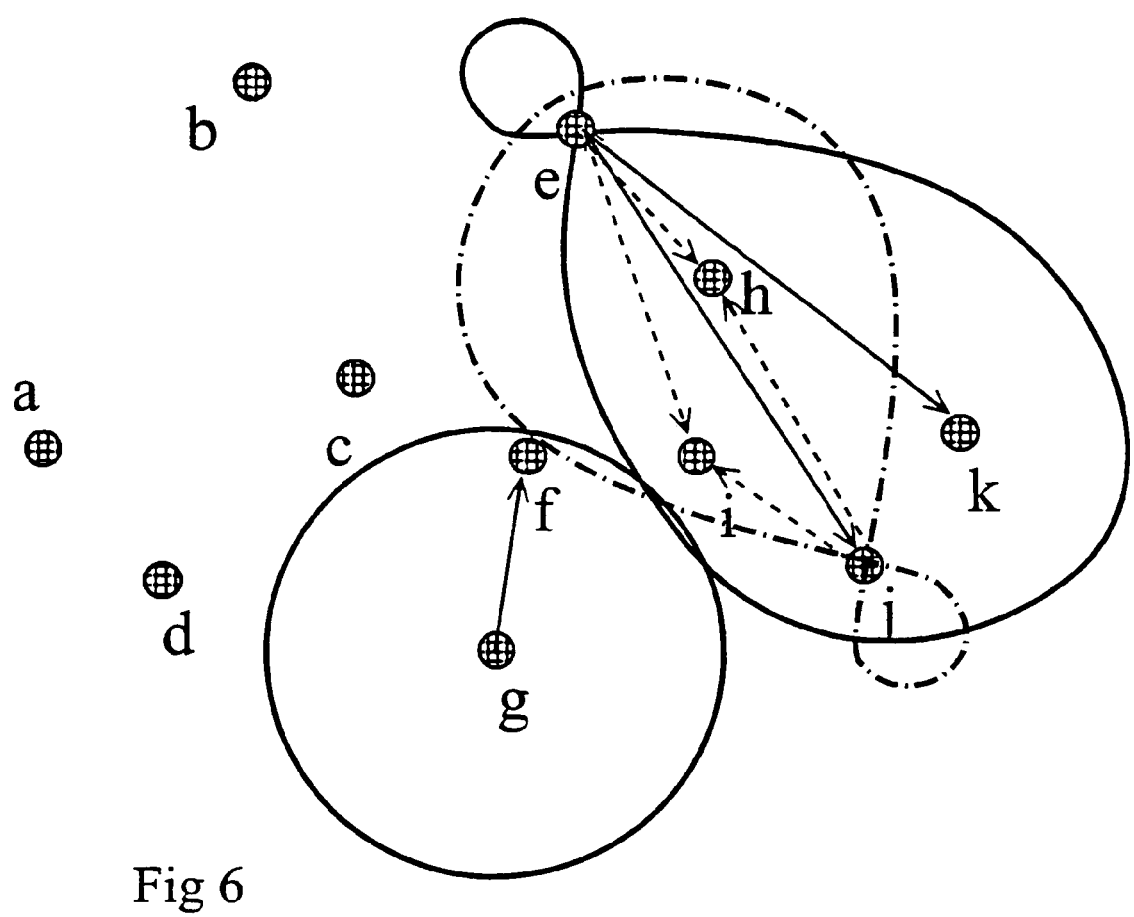
FIG. 6 shows in outline diagram form a further embodiment of the coverage area of the nodes.

FIG. 6 shows how on another occasion node g can transmit a message to node f in parallel with the ongoing communication between nodes e and j by changing the antenna.

By means of a system with client-based nodes, the size of these can be optimized dynamically as required. Different structures can be used depending on the longest transmission time which can be permitted for the respective messages. If a short transmission time is required, the transmitting and receiving nodes must be located within the same coverage area. If a longer transmission time can be accepted the message can be relayed between nodes. Relaying nodes do not need to know anything other than that a message received at a certain time is to be forwarded at a particular later time. This pattern is laid down in advance in the scheduling of the respective node.

The setting up of a common time base and time, a Global Time (GT), in the system is essential in order to be able to implement a scheduling of the traffic within the system. There are several methods of achieving a GT and these are not described here in greater detail but reference is made to existing literature and patents within the field, for example U.S. Pat. No. 5,392,421, U.S. Pat. No. 5,402,394 and specifications for GSM and Bluetooth which provide guidance for specialists in the field to find a suitable solution. In this example a protocol is outlined which supports global time.

The common time is circular, that is after it has reached a particular maximum value it starts again at zero. See for example "Circular Time" in the CAN Kingdom specification. When the system is started up, a node A is selected to be the time origin. Each message starts with a predetermined bit pattern. At a predetermined offset in the message the internal clock in each node is read off. Node A starts the transmission in the system and attaches its read-off time at the particular offset at the start of the message. Other nodes synchronize their time with node A's time by calculating their respective deviations. All signalling is related thereafter to the global time which has now been established. The accuracy of the global time can be improved by each node taking into account the signal delay from node A if this is known. By comparing later time messages from A the nodes can also correct for drift in their clocks. The specified offset is later utilized for time-stamping the transmission time for the message.

A system with node-based cells as described here can also be used for determining the position of movable nodes. Before entry into the system the movable node is given a place in the scheduling so that it can signal to the schedule-monitoring node, directly or via relaying nodes. In addition the node synchronizes its clock with GT. The movable node then listens to the ongoing traffic passively for a time, preferably while stationary, and records the reception time for the message and the signal strength. When convenient the node reports in the times and signal strengths of the signals. By comparing the signals received and their signal strengths with the other scheduled signalling in the time and propagation diagram, the scheduling node can estimate the geographical position of the movable node. The more nodes the movable node can detect and the longer the time it is listening, the more accurately can the geographical position of the movable node be estimated. The schedule can be prepared for movable nodes and a number of nodes can be instructed to listen for such movable nodes. When the movable nodes transmit the listening nodes record and forward the time and signal strength for the movable nodes to the schedule-monitoring node. This can then calculate a geographical position of each movable node. The more nodes that detect the movable node, the more accurately can its position be determined.

The movable node can be provided with a unit which detects its movement. Such a unit can be constructed of gyros and suitable calculation equipment in order to calculate the relative movement of the node. This information can be sent together with the information described above and the requirement for the node to be stationary during the measurement can then be reduced. In addition knowledge of the geography of the site, such as obstacles, walls, etc, can be used to improve the determination of the position.

Drawing Up of Propagation Diagram.

Figure 7:
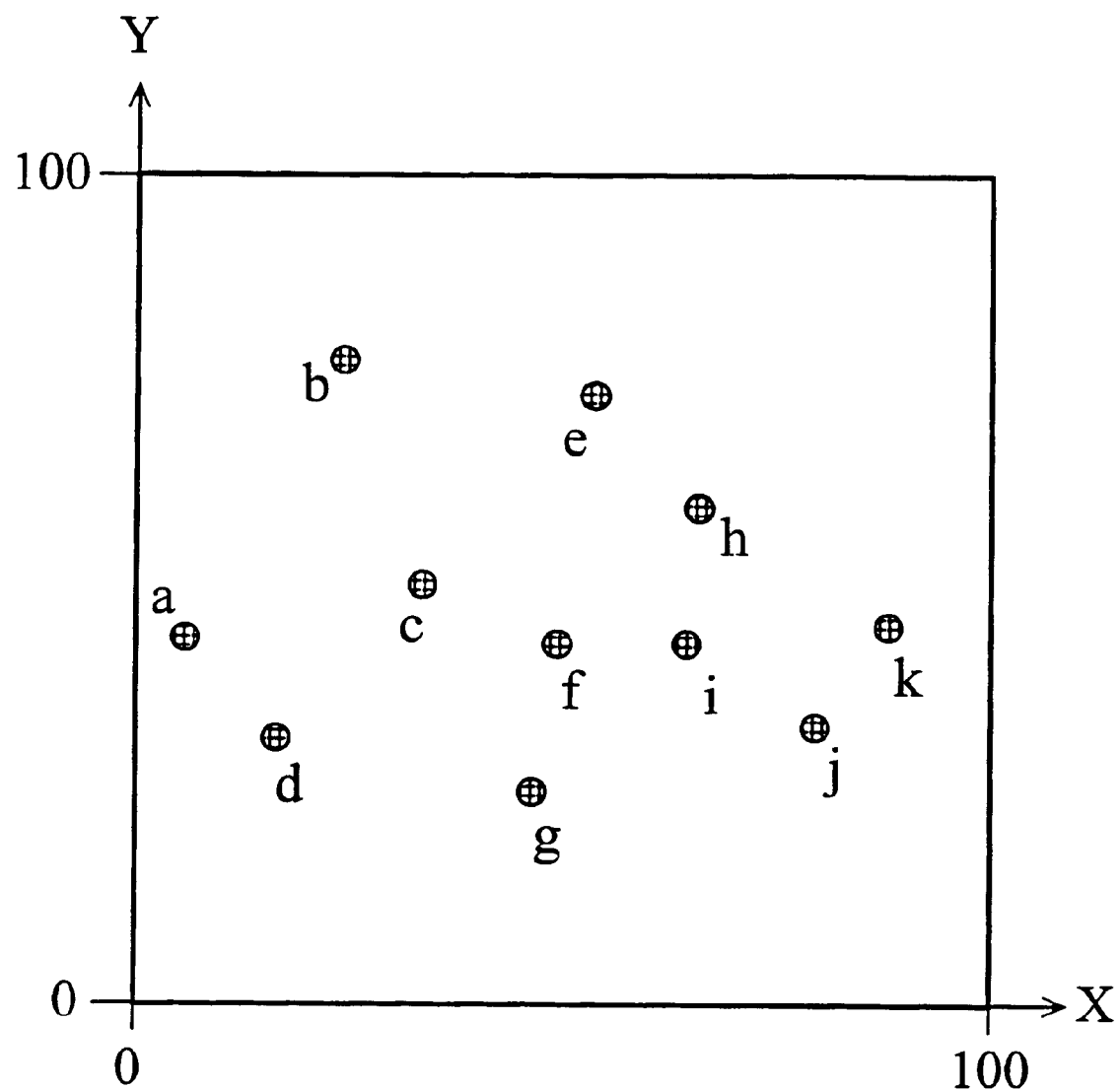
FIG. 7 shows in diagrammatic form the positions of a number of nodes within one and the same geographical area.

The basis for the propagation diagram is a local co-ordinate system which can be two or three-dimensional, polar or Cartesian. For the sake of simplicity we will describe here a two-dimensional Cartesian system. FIG. 7 shows an area within which the system is to operate incorporating the fixed nodes a to k. The X and Y axes are given in metres and the area is 100 m×100 m. First a centrally located node, in this case node f, is selected as the scheduling node. It operates in this position largely as a traditional base station. It starts transmission at the maximum power, for example 20 dBm, according to a suitable protocol, and the others adopt the listening position. Node f transmits a number of time-stamped messages at the maximum power so that the other nodes can synchronize themselves with its clock. In this way a global time is established. Thereafter f transmits a transmission/reception schedule. For the sake of simplicity we will assume that the global time is a maximum of 60 seconds and that each transmission slot is 1 second. See FIG. 8 where T20 indicates that a predetermined message is transmitted with an output power of 20 dBm and R indicates that 1. The node is listening for messages.
2. If the node receives a message, it records this and the reception time, the signal strength for reception and whether the CRC was correct.
3. If no message is received, the signal strength of the background noise is recorded.

Following the above sequence, node f transmits a schedule where each node, one by one reports its results. There then follows a scheduling as the first but with a lower power, for example 17 dBm, and subsequent reporting of results. This continues to the lowest output power, for example −10 dBm. The results are compiled and form the basis for later scheduling of the traffic, so that suitable output powers and antennas are selected for the communication between interacting nodes.

For scheduling movable nodes the investigation described above can give guidance but it is easier to use a movable node for the above measurement. This can be carried out by the movable node being given a measurement schedule which allows it to transmit continuously for a certain period of time, for example a minute. The position at the start can be specified precisely and thereafter the position is calculated based on the gyro data. At the start the clock of the movable node is synchronized with GT. Several control points within the area can also be used during the measuring procedure to further improve the quality of the measurements. Output power, time and position are specified in the movable node's messages. All fixed nodes in the system listen and report the message as above and also the stated position. By compiling the result the signal strength from a movable node can be estimated square metre by square metre. The process can also be reversed so that the movable node receives on-going traffic, records the time and signal strength of the received messages and also its position. By compiling the result it can be estimated square meter by square meter with what signal strength the various nodes can be received. In addition to suitable scheduling of movable nodes, the result can be used to calculate the position of movable nodes from the signal strengths of the transmitted and received messages.

By basing the scheduling on a predetermined signal pattern, the known position of fixed nodes and the calculated position of movable nodes, the transmitted messages do not need to contain either information about the identity of the sender or about the content of the messages. Only the values need to be transmitted in normal traffic. All other information is known in advance. The transmission time and the position of the information in the message are sufficient for the message to be able to be interpreted. This reduces the bandwidth required for a particular amount of information.

The invention is particularly suitable for use with field buses. Normally communication takes place in such field buses via cable connections. These can, wholly or in part, be replaced by scheduled radio traffic with dynamic cells. Messages can be scheduled to go via cable or radio, or via both, in order to reach the recipient. There are great opportunities with this technology for restoring redundant signal paths. A normal assumption for radio communication is that the probability of a message with interference is $10^{-3}$. Bit errors can be guarded against with error-correcting codes in the messages. By means of the method of time scheduling the communication it is possible to restore redundant signal paths in time and/or space simply and in this way to reduce the susceptibility to interference. If DSSS and RAKE technology are used, the energy in reflected signals can be utilized and the transmitting units can be provided with multiple antennas in order to increase the certainty of reception without bandwidth losses. In addition several transmitters can be connected together via cable connections and can transmit the same information in separate time slots from separate positions, or alternatively simultaneously in the same time slots. Several receivers can be connected together via a local cable connection and in this way redundant reception paths are obtained. The frequency spectrum can also be used in such a way that the same information is transmitted at the same time but on different frequencies. Each receiver receives at its own frequency and forwards the information on the local cable connection. By the use of time separation for redundancy the bandwidth is of course reduced. By combining the methods above in a suitable way the error frequency can be reduced to of the order of $10^{-9}$ or better, that is fully on a par with a cable connection.

Figure 9:
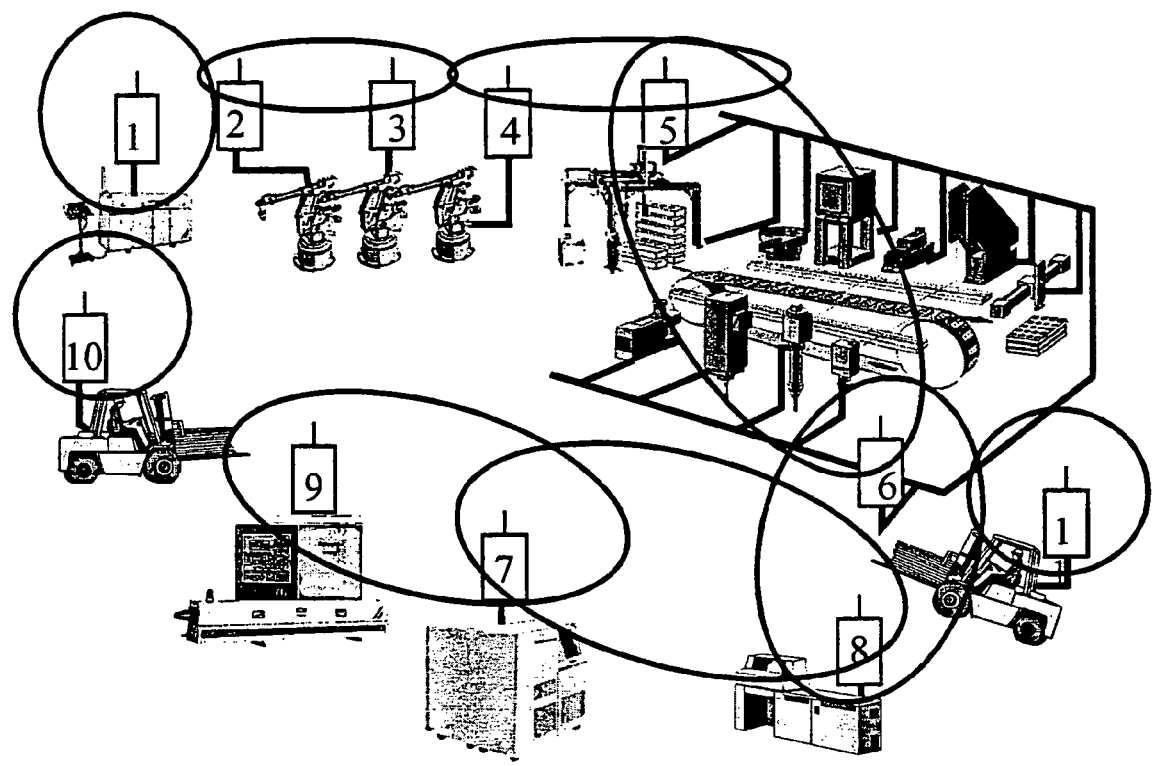
FIG. 9 shows in outline diagram form a system with machines and processes which are provided with nodes which interact in the system via radio connections.

In FIG. 9 the invention is used in connection with a first machine 1 and a second machine 2. In addition the system comprises a process control function which is indicated by 3 in the diagram. A fourth machine or process control unit is indicated by 4. In addition there are movable control units 5 and 6 by means of which machines and/or processes can be controlled via radio channels between units 7, 8, 9. The respective machines are provided with one or more nodes which are connected to the machine(s) and/or process(es) which are to be controlled via the nodes. Thus for example machine 1 is provided with one node, machine 2 with three nodes. The process 3 can comprise two nodes. The machine or process unit 4 can comprise two nodes 4a. The control units 5 and 6 each comprise their own node. FIG. 9 also shows mobile units 10 and 11 which can each be provided with a node. Each node operates with its own coverage area(s) or antenna lobe(s) which can be omnidirectional or directed in accordance with the above.

Figure 10:
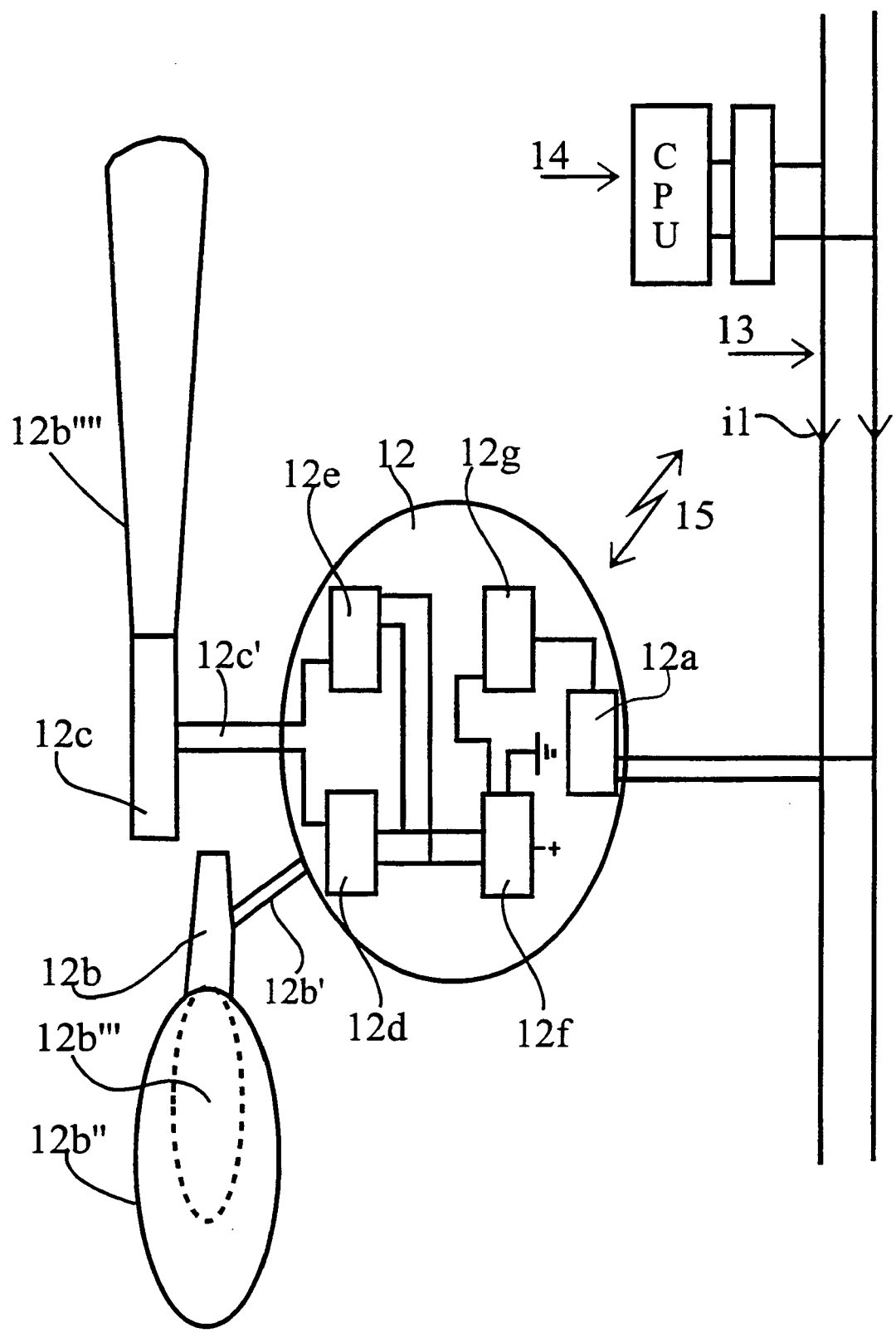
FIG. 10 shows in outline diagram form nodes with antenna units, which are controllable by means of centrally controlled clocks via cable connections.
Figure 11:
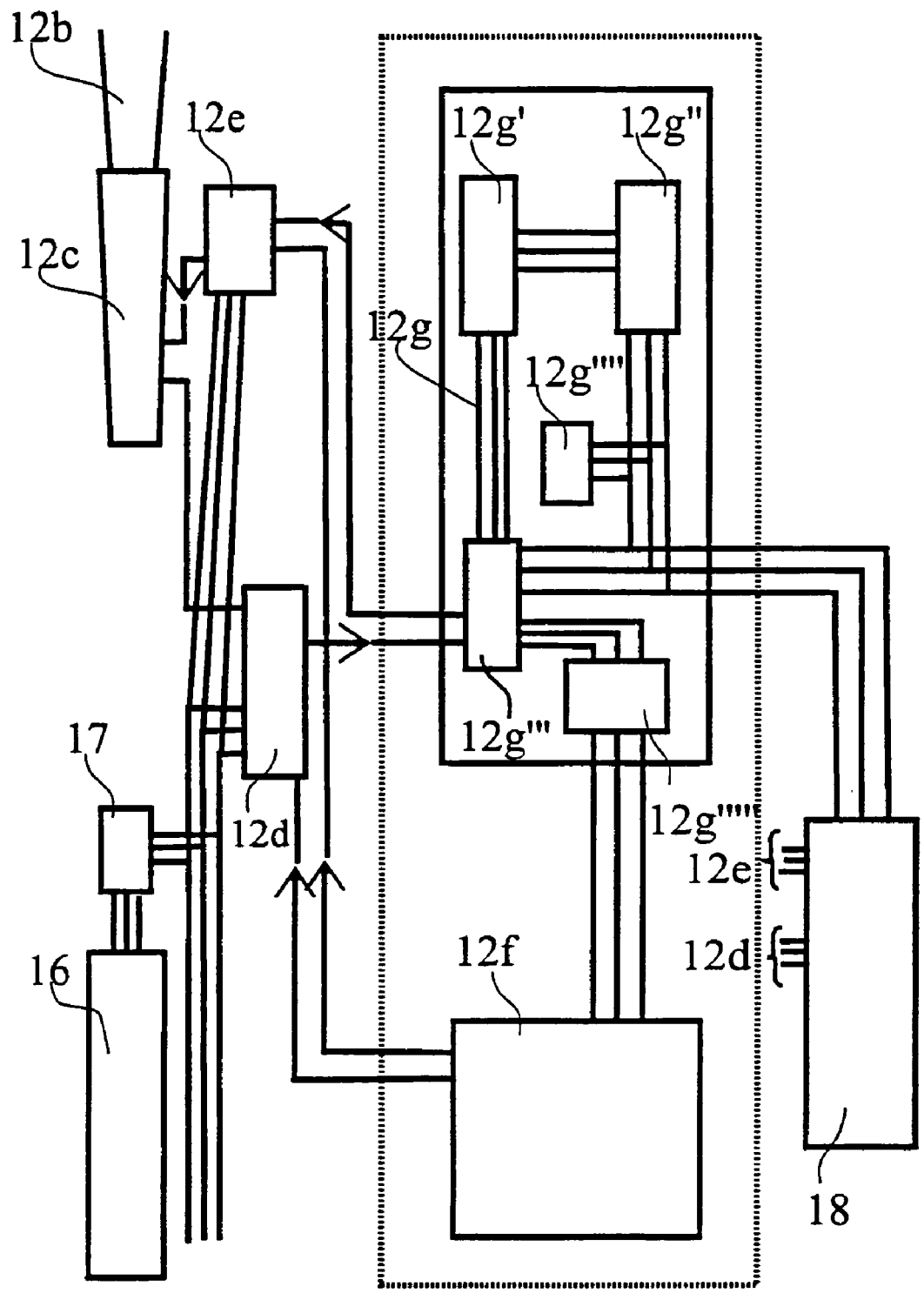
FIG. 11 shows in outline diagram form the interface of the nodes with the machine and/or process.

FIG. 10 shows an example of a fixed node 12 which can be connected to a fixed cable system 13 and via this cable system can be controlled by control equipment 14 which can be computer-controlled in a known way. An example of a control function can be that the unit 14 is to initiate one or more clock functions to the node 12 via the fixed system. This initiation is indicated by i1 in FIG. 10. The node comprises a connection unit 12a to the cable system 13. In addition the node comprises one or more antennas, for example two antennas 12b and 12c. The antennas can also be connected to the node via the connection cables 12b' and 12c' respectively. The node also comprises a radio receiver 12d and a radio transmitter 12e. In addition the node comprises an activation device for the abovementioned receiver and/or transmitter, which activation device is indicated by 12f. The time-determination device 12g is connected to the activation device or is incorporated in this. The time-determination device is set from the unit 14 via the cable connection 13. Alternatively or in addition the time determination can be effected via a radio channel 15. Depending on the time determinations and the activations the receivers or transmitters activate their antennas for reception or transmission in order to establish the abovementioned coverage areas or antenna lobes 12b", 12b''' and 12b''''. In FIG. 11 an interface with an actual machine and/or process is indicated by 16. The adaptation unit 16 can receive and transmit data and/or control commands to the node and transmission and/or reception can thereby be carried out via a microcomputer 17. The connection of one or more activation devices 12f to the above-mentioned receiver and transmitter is shown in more detail in FIG. 11. In addition the principle construction of the time-determination device 12g is shown. The time-determination device can comprise an internal clock 12g'. In addition there can be a reception circuit 12g" for the master clock function in the system, cf. the case with FIG. 10 above. The time-determination device can also comprise a reception circuit 12g''' which obtains time-determination functions via the receiver and its antenna 12c. The time-determination functions are handled in the time-determination device by means of a microcomputer 12g''''. The microcomputer can comprise or work with memory functions for storage of the node's setting in relation to the slots in the system. In addition there is an adaptation unit 12g''''' for the activation device 12f. The circuit 12g''' also interacts with a scheduling function 18 in which the node's settings for the slots in the system can be entered.

Figure 12:
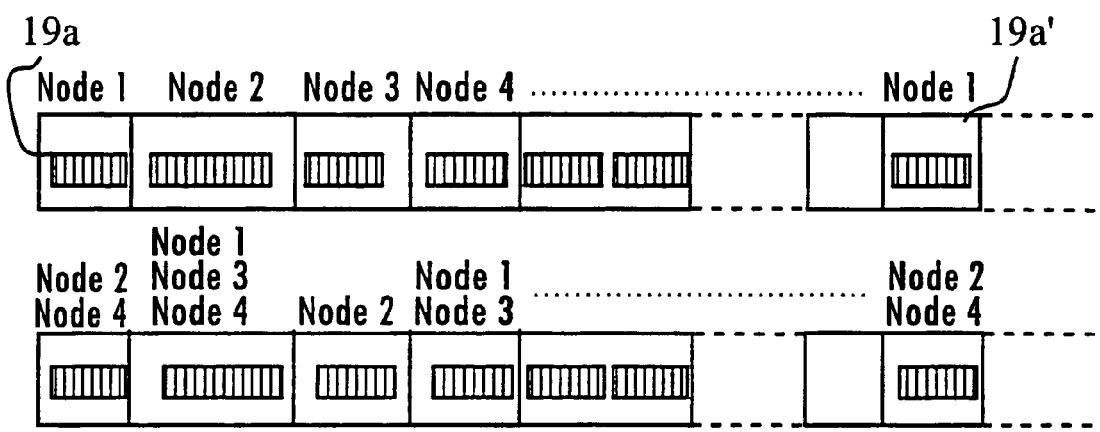
FIG. 12 shows in outline diagram form the slot allocation in the system for involved nodes.

FIG. 12 shows the arrangement of the slots for transmission and reception. In position 1 according to FIG. 12 node 1 has been allocated the slot space 19a, node 2 19b, node 3 19c, node 4 19d and so on to the end of the circular calculation. Thereafter node 1 is allocated slot 19a' and so on in the second circular calculation, and so on. Other allocations and lengths of the slots can be allocated to the different nodes depending on the data and the control commands which are to be sent in the respective slot. The slots for reception are constructed in a corresponding way but with delays in relation to the slot arrangement for transmission.

Figure 13:
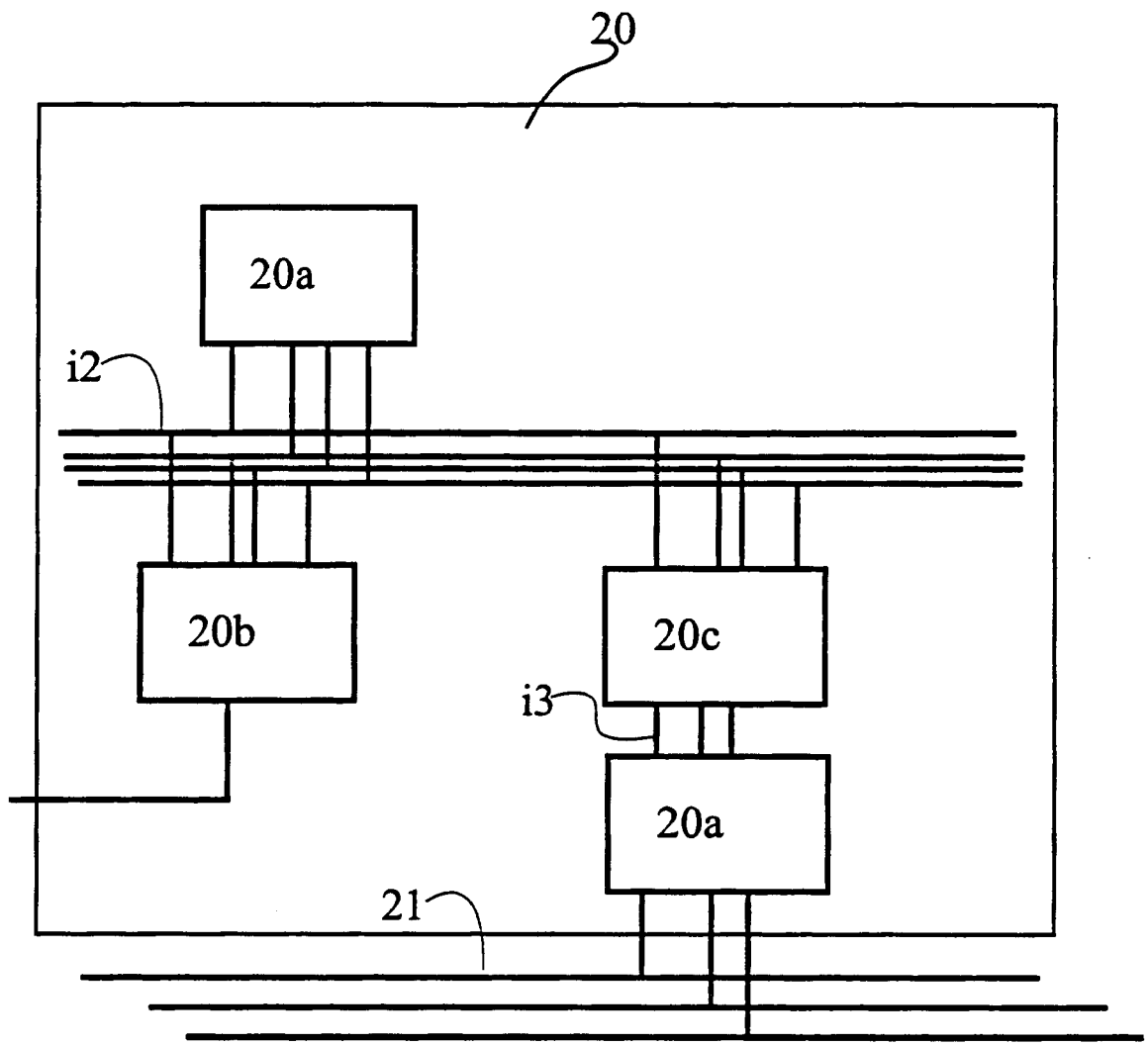
FIG. 13 shows in outline diagram form the construction of a node which operates with different types of message.

In accordance with FIG. 13 one or more nodes can be arranged to work with different types of message. Thus, for example, there can be a first type of message i2, which first type of message can concern internal messages within the node and/or the machine and/or process controlled by the node. The node can comprise a microcomputer 20a and an adaptation circuit for the machine and/or process, which adaptation circuit is designated 20b. A second type of message i3 can concern messages over a fixed connection 21, where the adaptation circuits are designated 20c and 20d.

Figure 14:
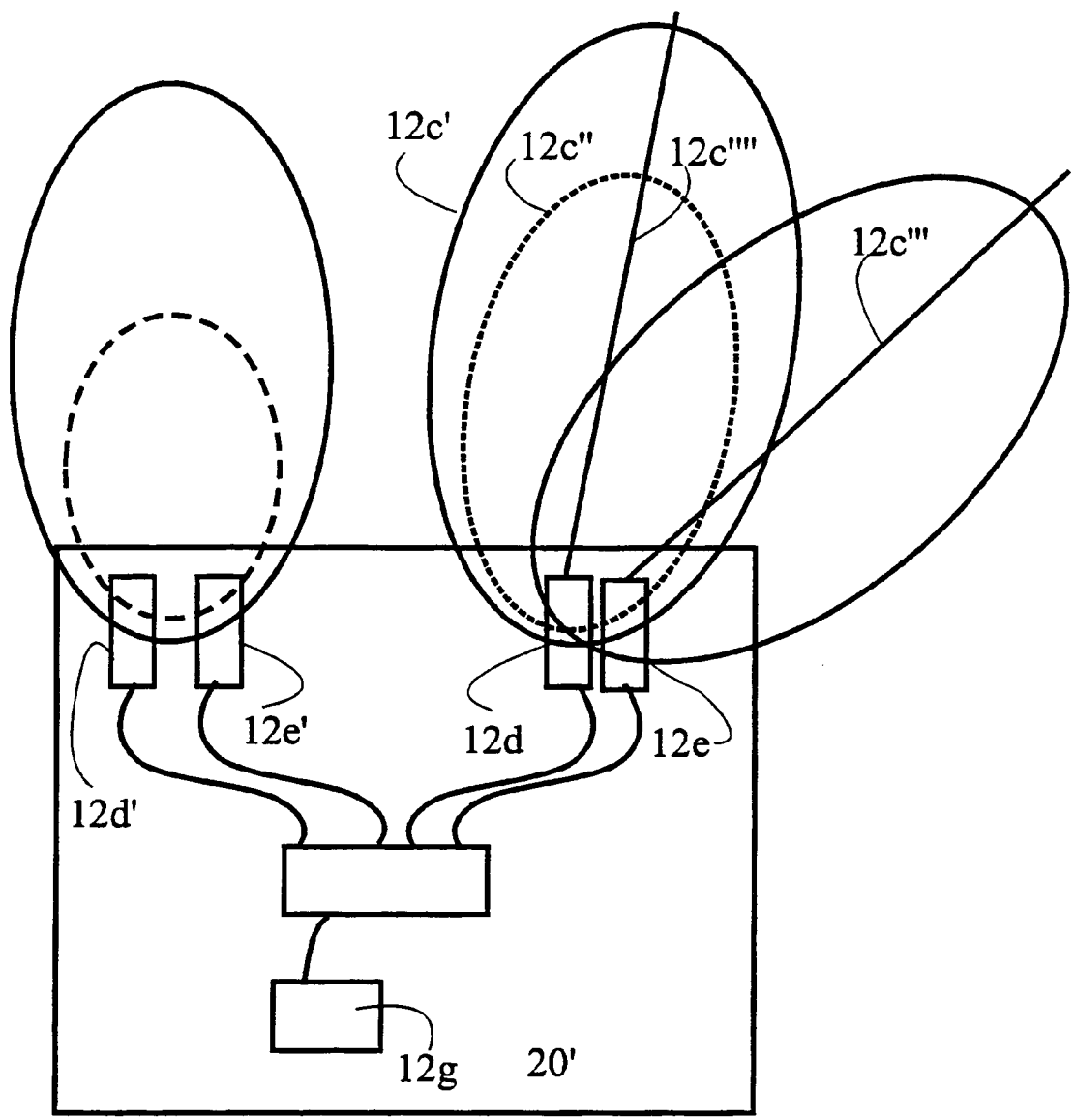
FIG. 14 shows in outline diagram form the antenna lobe propagations for the antennas at the nodes.

FIG. 14 is intended to show a node 20' with double receivers and transmitters 12d, 12e and 12d', 13e' respectively. The abovementioned transmitters and receivers are controlled by the time-determination function 12g which can be incorporated in or comprise the activation function described above. The activations can bring about different lobe sizes 12c', 12c". In addition and/or alternatively the lobes can be allocated different directions 12c''' and 12c'''' respectively. This applies correspondingly for the lobes controlled by the receiver and the transmitter 12d', 12e'.

Figure 15:
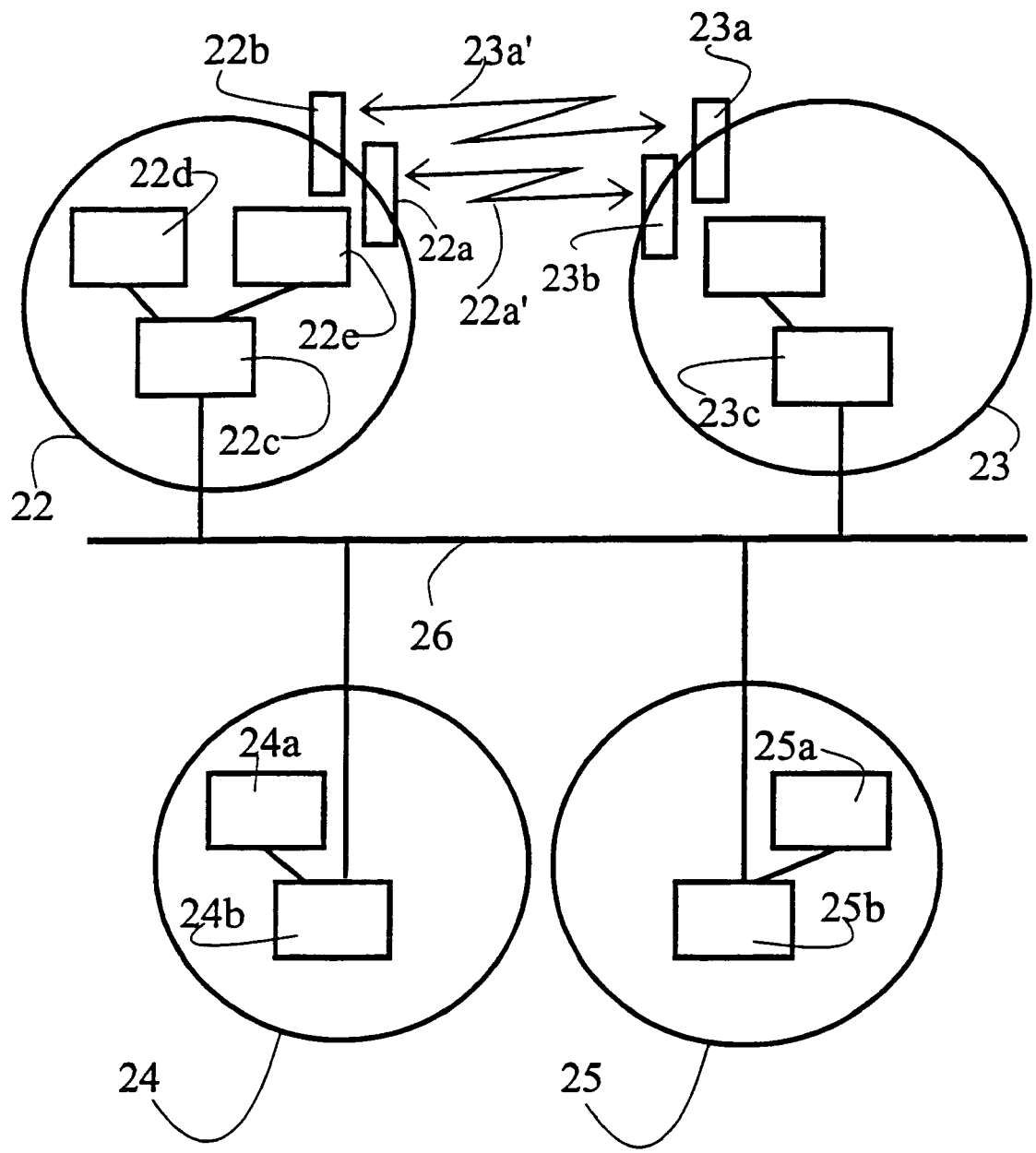
FIG. 15 shows in outline diagram form how the nodes can be activated via cable connections and can communicate with each other via radio connections.

FIG. 15 concerns an arrangement in connection with automatic or manual scheduling in the system. In the figure two fixed nodes are indicated by 22 and 23. The nodes work with transmitters and receivers and radio connections as described above. The abovementioned transmitters and receivers are indicated by 22a, 22b and 23a, 23b respectively. The radio channels are indicated by 22a' and 23a' respectively. Interaction can take place with conventional modules 24, 25 in a cable-connected system, the bus connection of which is indicated by 26. The activations of the antennas and the indication of the time determinations can be carried out from the units 24 and 25 respectively which are provided with an activation device 24a and time-determination device 25a respectively. The units 24 and 25 are provided with adaptation circuits 24b and 25b respectively for the cable connection 26. The nodes 22 and 23 contain corresponding reception circuits 22b, 22c and 23b respectively.

Figure 16:
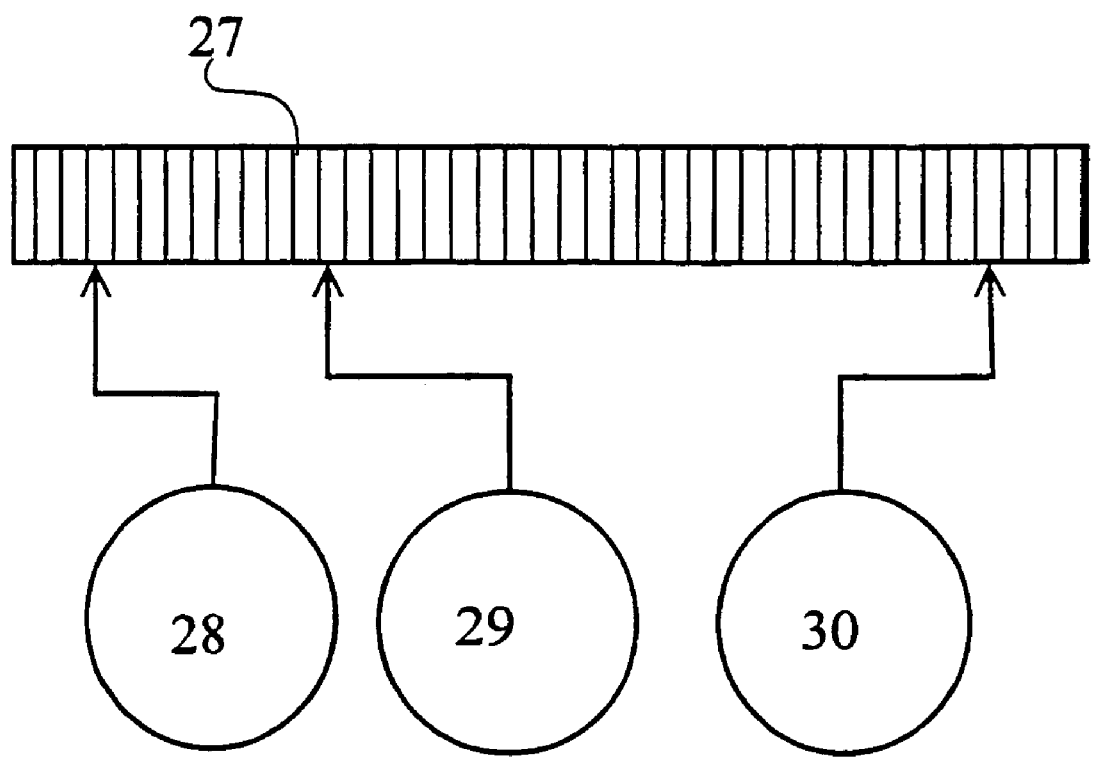
FIG. 16 shows in outline diagram form the relationship of the nodes to the frequency spectrum for so-called jumping frequencies.

FIG. 16 shows the relationship of the nodes to the frequency spectrum and to jumping frequencies. The selection of the respective frequency composition from the spectrum 27 for the different nodes 28, 29 and 30 is illustrated and can be carried out in a known way.

Figure 17:
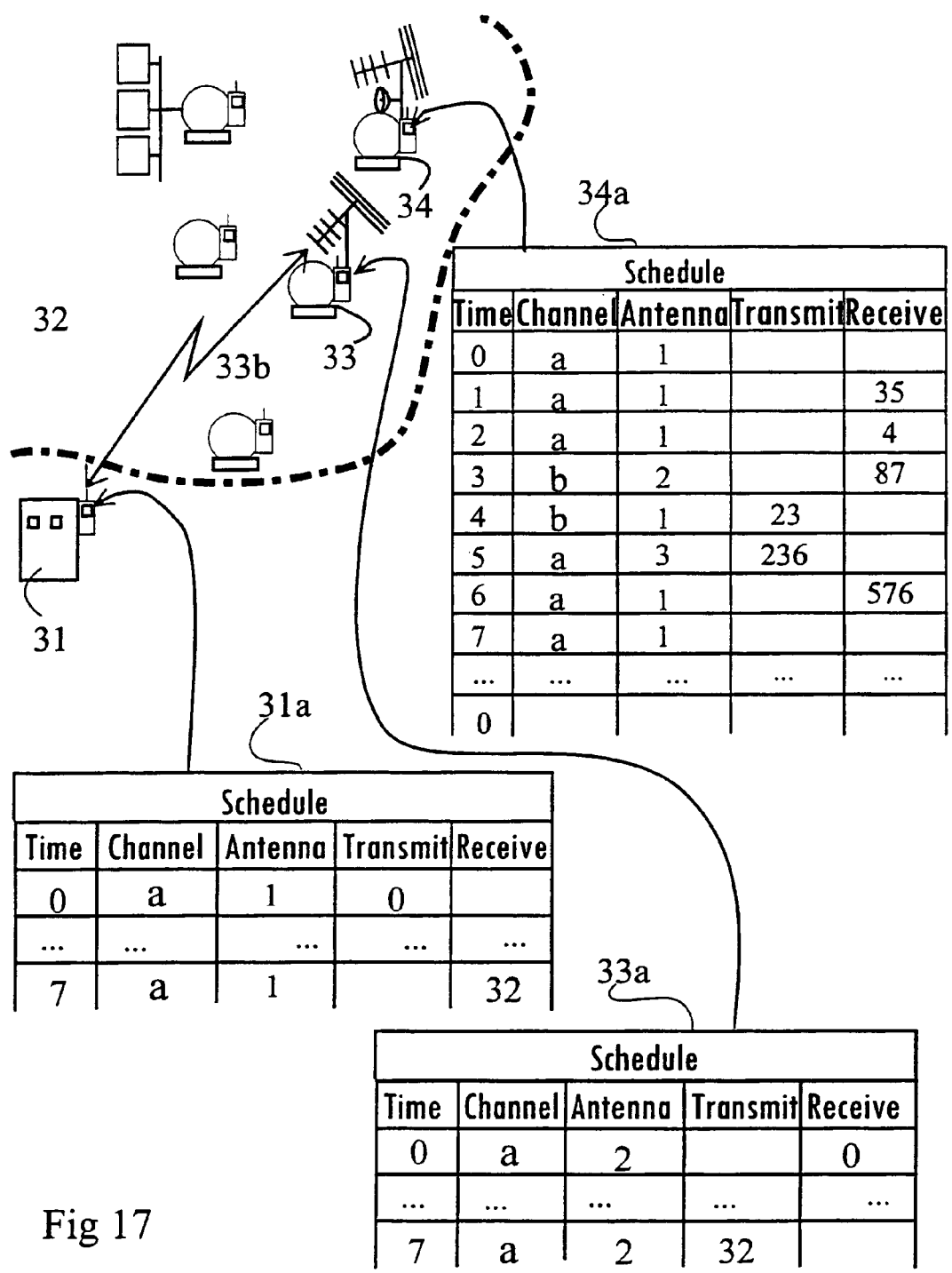
FIG. 17 shows in outline diagram form a system with fixed nodes and where movable nodes are on the point of entering the geographical area of the fixed nodes, and scheduling in connection with this.

FIG. 17 shows a more detailed embodiment of how a mobile node 31 can approach a geographical area 32 with a number of fixed mobile units, of which two are indicated by 33 and 34. The fixed units 33 and 34 are entered in the overall scheduled system and have schedule configurations 33a and 34a respectively which show the slot allocation for the abovementioned fixed nodes 33 and 34. The movable node 31 is also already entered in the schedule pattern. One or more of the fixed nodes detect the positions of the movable node in accordance with the above. In the different schedule arrangements 31a, 33a and 34a respectively have been given a circular time allocation between 0 and 7. The mobile unit is thereby allocated a channel and uses its antenna 1. In the slot or the time 0 the mobile unit transmits the information 0 and in the slot 7 the mobile unit receives the information 32. The fixed mobile unit or node 33 which is responsive to the movable mobile unit or node in question via a radio connection 33b is in the reception position at time 0 and in the transmission position for transmission of the information 32 in the slot 7. The node 33 is also set to channel a and has its antenna 2 activated. The fixed node 34 can operate on the channels a and b with its three antennas 1, 2 and 3. In the slots 4 and 5 the node is connected in the transmission position when it transmits the information 23 and 236 respectively. Node 34 is activated for reception during the slots 1, 2, 3 and 6 when it receives the information 35, 4, 87 and 576.

Figure 18:
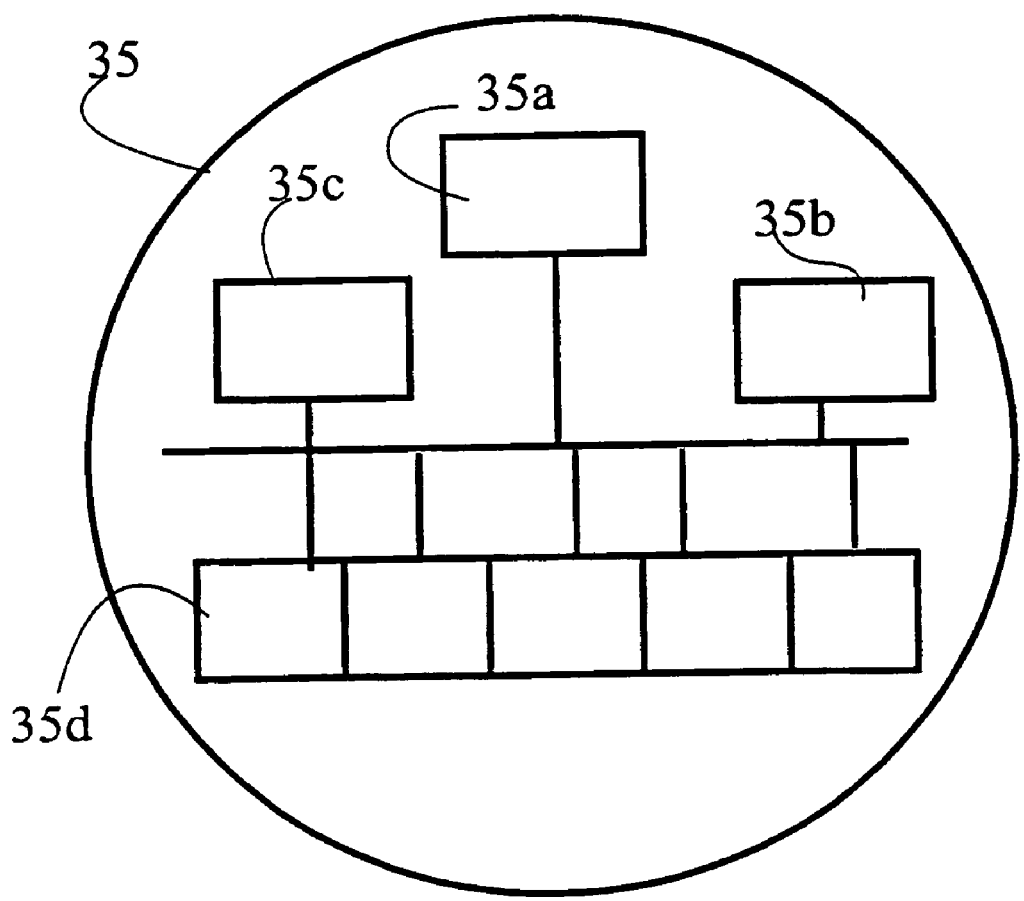
FIG. 18 shows in outline diagram form the parts comprising a movable node.

In FIG. 18 a movable node is indicated by 35. The movable node can comprise combined gyro and calculation circuits 35a and the node's receiver is indicated by 35b. The node works with a microcomputer 35c and memory functions 35d, in which are recorded ongoing traffic, received messages, signal strengths and information about its own position.

Figure 19:
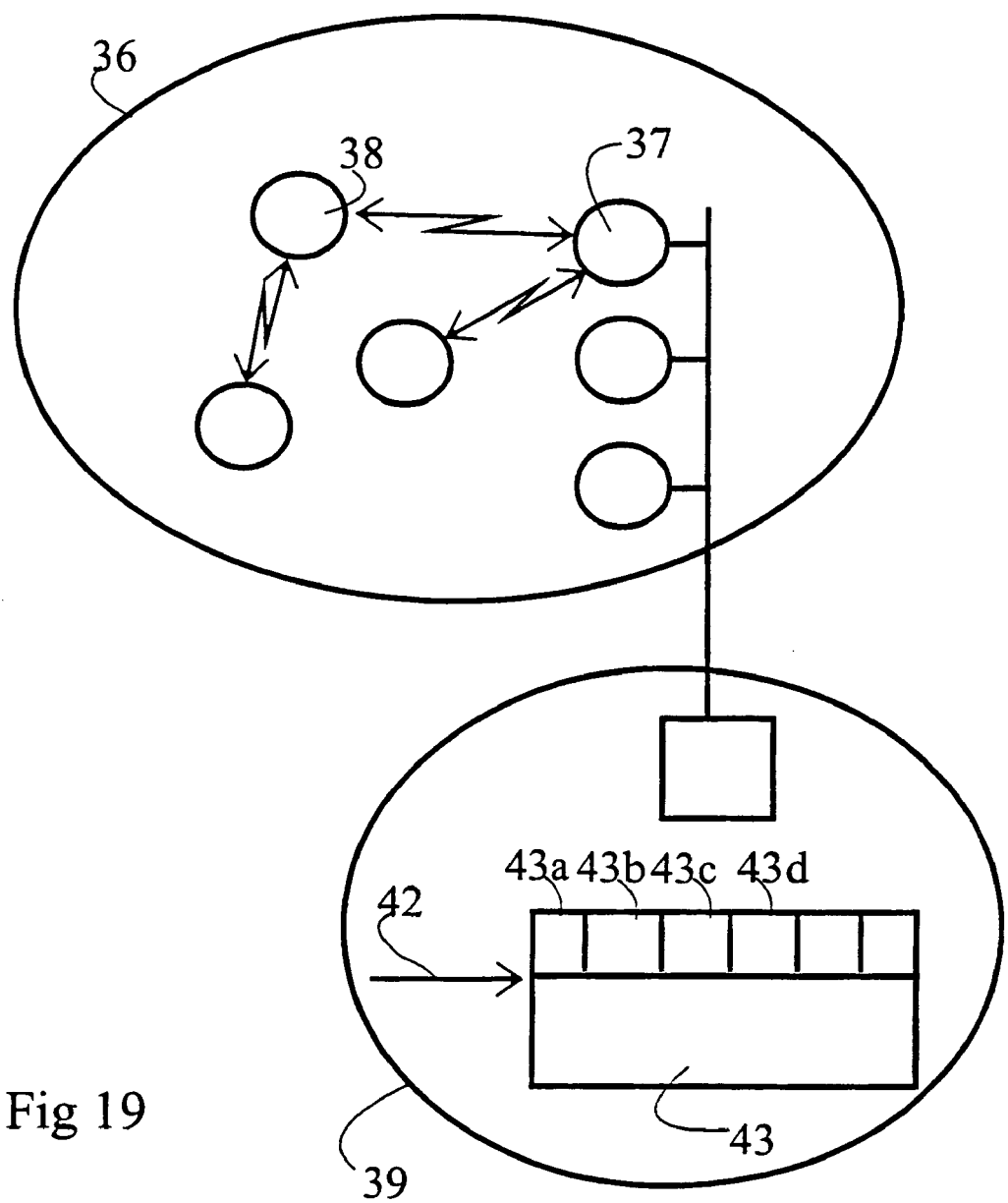
FIG. 19 shows in outline diagram form a system with fixed and movable nodes and scheduling functions in connection with this.

FIG. 19 shows a geographical area 36 with fixed nodes 37 and movable nodes 38. One or more of the fixed nodes 37 are connected to a scheduling unit 39. The fixed connections are indicated by 40 and an adaptation unit for the unit 39 is indicated by 41. The scheduling unit is arranged to start from a predetermined signal pattern 42 and accept information about or comprise information about the positions of the fixed nodes, the positions of the movable nodes, transmission times and the respective locations of the information. The scheduling unit is indicated by 43 and the memory or storage device for the positions of the fixed nodes is indicated by 43a, the positions of the movable nodes by 43b, the transmission times by 43c and the respective locations of the information by 43d. The unit 39 can essentially consist of a node which is selected from the other nodes in the system.

Figure 20:
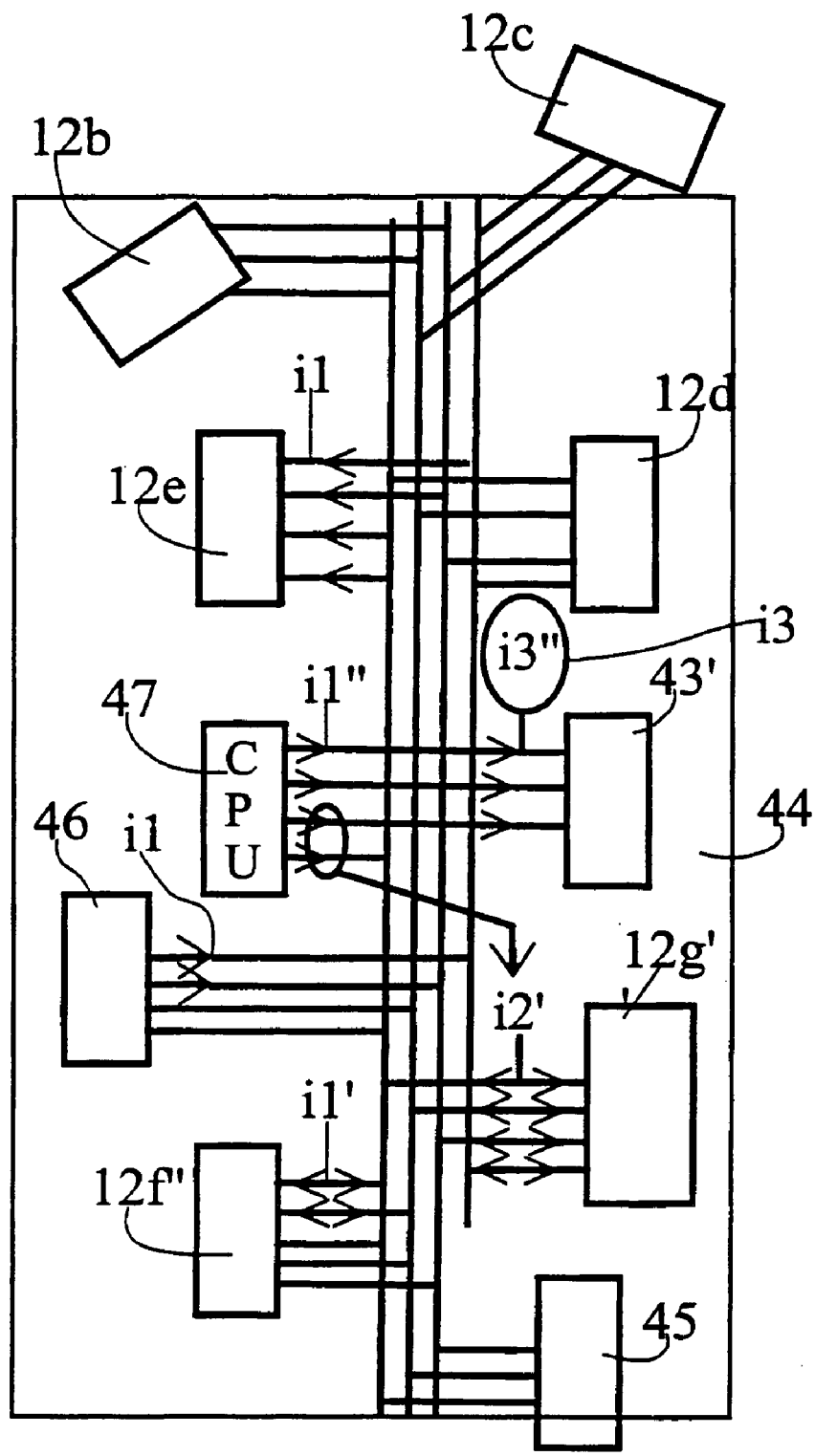
FIG. 20 shows in outline diagram form the construction of a node in greater detail.

FIG. 20 shows an example of the construction of a node 44 with activation device 12f, time-determination device 12g", receiver 12d, transmitter 12e, antenna 12b, antenna 12c, controlling clock 45. The abovementioned clock controls the program and synchronization function of the nodes. In addition there is a reception or transmission circuit for receiving or transmitting data, which circuit is indicated by 46. A CPU or microcomputer is indicated by 47 and signalling of the function controls for communication is indicated by i1'. The signals i2' transmitted in the system concern information about the global time. FIG. 20 also shows information i3' which is used for the scheduling in the system.

Figure 21:
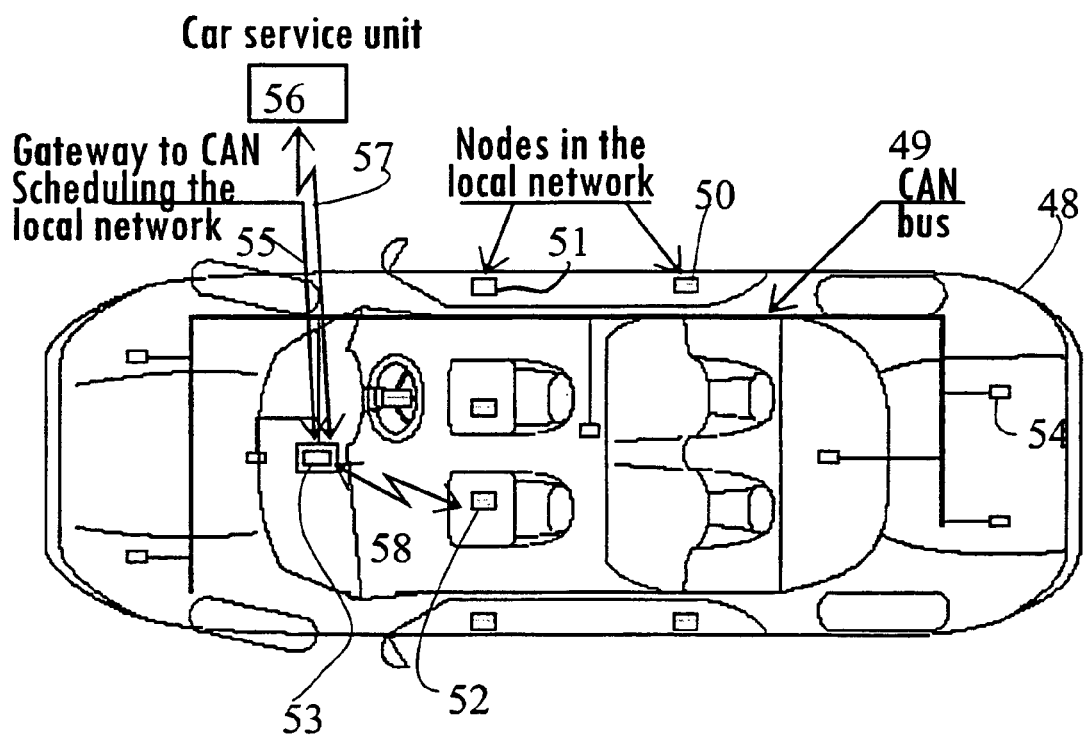
FIG. 21 shows a concrete embodiment which utilizes a system of nodes in a local network and a mobile unit which is provided with a CAN bus system.

FIG. 21 shows a car 48 which comprises a CAN bus system 49. The car is also provided with a number of nodes 50, 51, 52, 53, etc, which are incorporated in a local network in accordance with the above. The CAN bus system comprises a number of modular units 54 of a known type. One of the modules, namely module 53, is used to establish the scheduling in the local network in accordance with the above. A connection 55 acts as a gateway to the CAN system. In addition the unit 53 is in contact with a car service unit 56 via a radio connection 57. The unit 5 is also in connection with the abovementioned nodes in the local network, for example node 52, via radio connections 58. By utilizing the arrangement according to the invention the car 48 can be driven into a vehicle workshop and be connected or interact with the car service unit 56 in accordance with the above.

Figure 22:
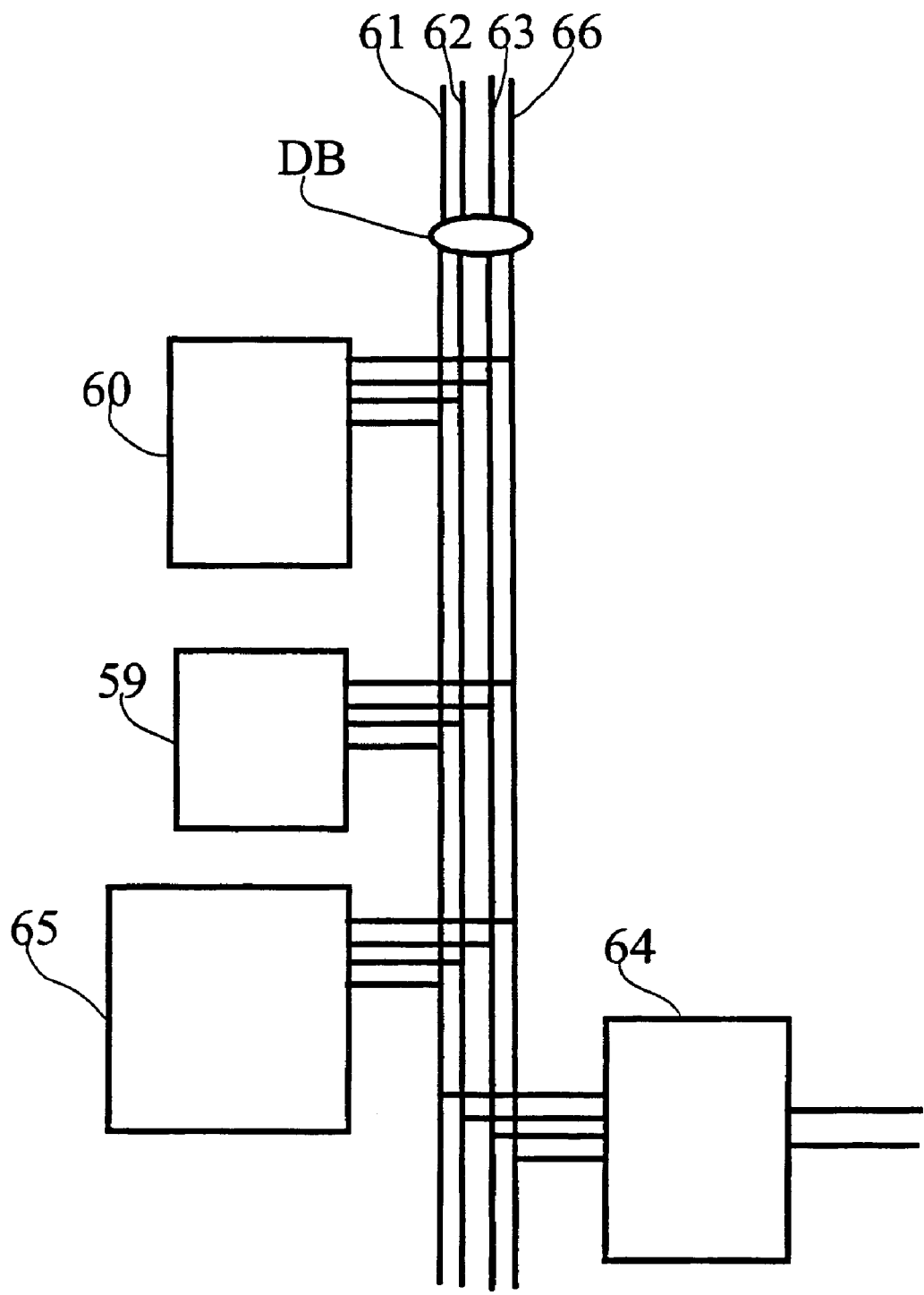
FIG. 22 shows in block diagram form a radio module with two directional antennas connected to a cable communication connection.

A radio module can have a construction as shown in FIG. 22. The described functions are implemented preferably with a large degree of flexibility and the ability to configure the units to operate in an optimal way and to operate at various locations both geographically and in time. The module comprises a microcomputer or other logic device which can process and store information. The storing of information means that there is logic with a memory function which can be a temporary memory, so-called RAM, which can be of the type SRAM and DRAM. There are also memories which can retain the information without a supply voltage and these can be of one or more different types, for example Flash, ROM, EPROM EEPROM, which differ in how they are programmed and in the ability to make changes to the stored information after programming, which in an embodiment can retain the information after an interruption in the power supply.

A unit consists of a computer unit, CPU, 65 which executes a program stored in a program memory 59. The program has a RAM 60 for temporary storage where, for example, data which is received by radio is placed before it is transferred to another form of communication medium or is processed internally in the module. The memories are connected to the CPU by a data bus 61 and address bus 62 and a number of control signals 63, for example signals such as WR, RD, CS and ALE. The number of leads in the address bus can vary depending on how large a memory must be addressable. A normal number is 16 which is required to address a 64 Kbyte memory. It is not unusual for the number to be up to 32 for a processor with a 32-bit working width, however it is seldom for all these to be used or for several addresses to select the same address space. The number of computer leads depends on the working width of the processor, with 8 for an 8-bit processor, 16 for a 16-bit processor and 32 for a 32-bit processor. There are also processors with a working width of 4 bits but they are uncommon in this type of application. For processors with 16- or 32-bit working widths, the data leads can be reduced, particularly at the connection to external equipment. Normally 32-bit processors can also read and write to memories and external units with a data width of 8 or 16, and similarly 16-bit processors can also read 8-bit units. These or a proportion of these signals can be connected to circuits which can be of the type CAN controller 64 and radio interface 65. In addition to the signals which are transmitted by means of these signal leads, information can be transmitted between the CPU and the surrounding parts. Thus, for example, information which has arrived at the CAN controllers can be moved into RAM. When the information which has arrived receives authorization to be transmitted by radio then the information is moved from RAM to the radio unit. In addition to the signals 61, 62 and 63 there are other signals and leads 66, for example supply, reset and clock. There can also be additional circuits and signals for handling the clock and times. The parts which concern the invention will be described in detail in other parts of the text. The computer bus is indicated by DB.

The CAN controller 64 can in this case describe the communication unit which uses cables and leads to exchange information with other units. It does not need to be CAN for this type of connection, but could also be Ethernet, Fieldbus Foundation or timed triggered protocol. In most cases these communication protocols can use electrical signals as well as optical or other electromagnetic field propagation to transmit information signals from one controller unit to another. The information can be transmitted from one to all as is normal in CAN where by means of selection the receiving unit chooses the information which is to be forwarded to other parts of the system. Transmission can also be such that several units can transmit simultaneously by different types of modulation, which makes it possible to obtain different channels and the receivers can then by means of their setting choose the channel on which they expect the information to arrive. This makes it possible for several units to transmit simultaneously and for the units to carry out a rough sorting of all the information which is to be found in the transmission medium.

The units described above can be packaged or arranged in different circuits which are connected together on a circuit board or other type of circuit carrier. It can also be the case that all or parts of the electronics are integrated on one and the same circuit unit. Regardless of the level of integration, the components described here can always be distinguished if the equipment is studied at component level. In certain cases it can be difficult to distinguish the components from the documentation of the components as certain parts of the hardware can be so-called FPGA (Field Programmable Gate Arrays). These components have hardware which can be configured using data which is stored in some type of memory or which is downloaded to the unit via CAN, radio or other form of communication. This information is thereafter transmitted to the FPGA component which is thereafter given a hardware function such as CAN controller or radio controller. Such a component can also comprise RAM. It is also possible for such a FPGA to comprise information stored permanently so that it has the required configuration right at the start. Configuration data states how the hardware is to function in detail.

Figure 23:
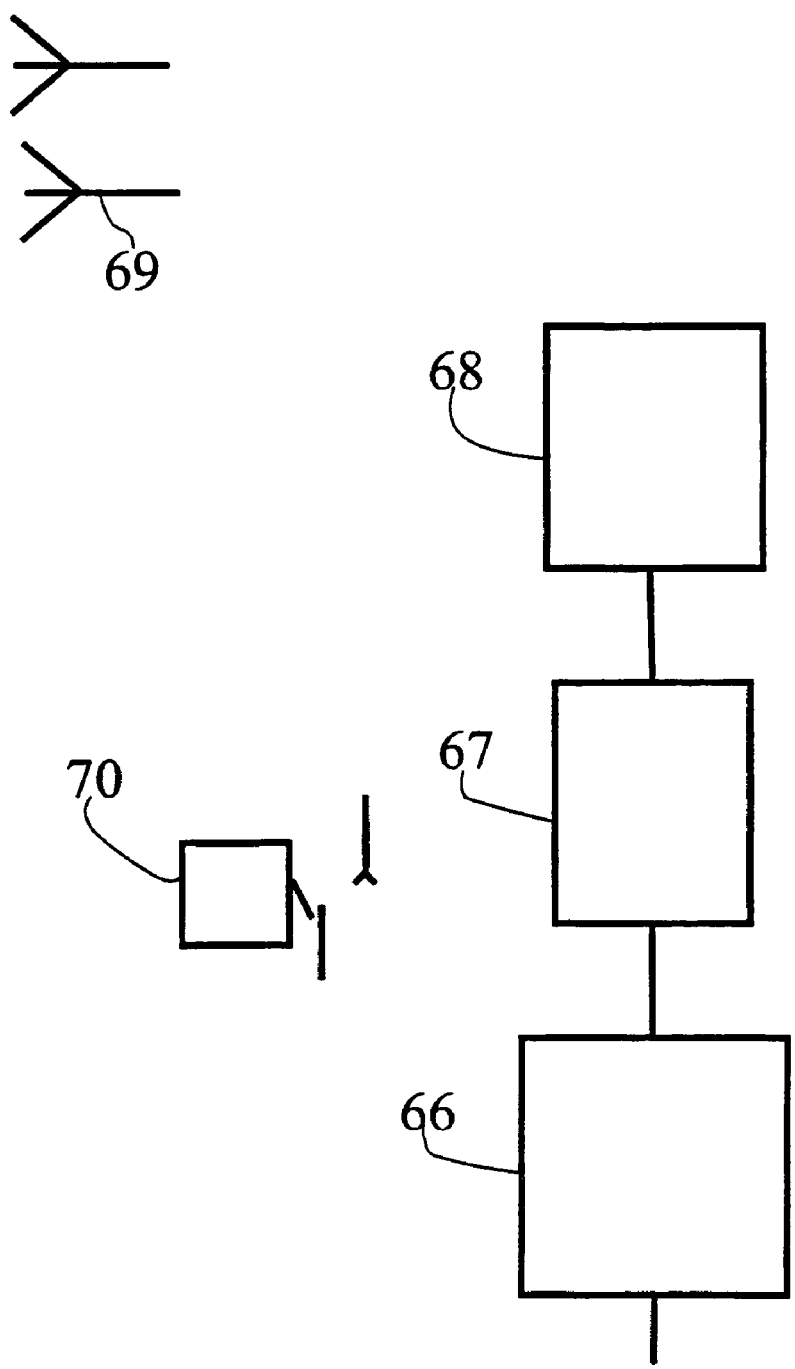
FIG. 23 shows in block diagram form the principal parts in the radio component.

Part 66 according to FIG. 23 is the logic which connects together the radio and the computer unit. This is carried out using the data bus 62, where the number of signals on the different signal buses is adapted to the actual requirement. The unit 66 comprises firstly memories or registers for storage of the bits which are to be transmitted or which are received from the radio part. These memories/registers can be of different sizes depending on the construction and performance of the computer part. When the radio part commences its transmission, the bits are transmitted at a certain speed which is determined by the set bit rate. A usual speed is 1 Mbit/s but 2, 5 or 11 Mbit/s are also common. In systems with a small amount of data there can be slower transmissions, for example 9600 bits per second.

In the description only digital transmission is described but of course it is also possible to transmit analogue signals. In the description concerned it will then be necessary to have some kind of analogue to digital conversion. If great time precision is required in this transmission it is expedient to integrate this part in 66 or for there to be an explicit connection to some other circuit which handles this analogue to digital conversion. If the processor is powerful it is possible to transmit data via this unit from the analogue to digital conversion part to the radio part. In this case reference is made to the function between the CAN controller and the analogue to digital converter where data is transmitted from CAN to radio on the one hand and from analogue signal to radio on the other hand. In a corresponding way information which is received from the radio part can be transmitted to CAN or an analogue signal, depending on which equipment the unit comprises.

Where a fast and powerful processor is available there can be a small register in 66, for example 8 or 16 bits, for data which is to be transmitted or received from the radio. For this register there is then a shift register which outputs the bits to the radio part. When the logic in 66 starts to shift out the bits to the radio for transmission, the computer unit used must replenish this register and ensure that the information is in place before the logic in 66 has shifted out the last bit and must load the next block of data into the shift register. If the processor has little computing power or if this unit is to have its load lightened, this storage memory can be made larger so that the processor needs to load in new data less often. With a larger memory it is also possible to transmit a larger quantity of data as a block. In this case the memory can be 8 to 32 bytes in size and it is then usual for this to be of the FIFO type, that is First In First Out. In other cases it is possible for the memory to be so large that the whole radio packet is stored in 66. In this case the whole packet is loaded into the memory and thereafter the logic in 66 can carry out the whole transmission without involving the processor. The logic in 66 can be logic or logic-configured in an EPGA. It could also be a computer-like unit which uses a program to emulate the function which is required in this part of the electronics. Reception is in principle the same as transmission, except that everything goes in the other direction. In the logic the construction can be such that the same memory register and/or shift register is used for both transmission and reception, where the direction of the data flow is changed by some signal. It can also be such that there are two separate sets of all the electronics for transmission and reception. In most cases the radio communication takes place with one-way transmission, that is it is not possible to transmit and receive simultaneously, and in this case it is possible to utilize this double function in the electronics. Where the radio allows simultaneous transmission and reception it is necessary to have two completely independent sets of electronics, memory and shift logic for transmission and reception.

The digital bit stream from 66 then comes to a unit which radio-adapts the digital stream of bits, which takes place in unit 67. It can be the case that this part adds a number of bits at the start and/or the end of the digital stream of data from 66. Whether this takes place or not depends on how much of the radio protocol is built into 67 and how much takes place in 66. When the stream of bits is adapted to the relevant radio protocol, for example in accordance with 802.11 or Bluetooth, this is to be modulated to something which is better adapted to radio transmission. This can be carried out in one, two or more stages. In 802.11 DSSS this can be carried out by a first conversion of the bits into one or more analogue signals. These analogue signals are then modulated to a medium frequency, for example 374 MHz, and in a final stage they are converted up to the radio transmission band which in this case is in the range 2450 to 2485 MHz. How this conversion is carried out and the number of stages is irrelevant for this invention.

In the description the transmission of information takes place serially one bit at a time. It is of course possible to increase this so that it is possible to transmit in parallel with several serial channels. The invention is not restricted to one channel but can of course be utilized for several parallel channels. These different channels can be processed individually independent of each other or in such a way that the scheduling is co-ordinated. It can be necessary to make this co-ordinated when the information on several channels must reach the receivers synchronized in time. A unit 68 is connected to the unit 67 and antennas are indicated by 69. In addition there is a unit 70.

Figure 24:
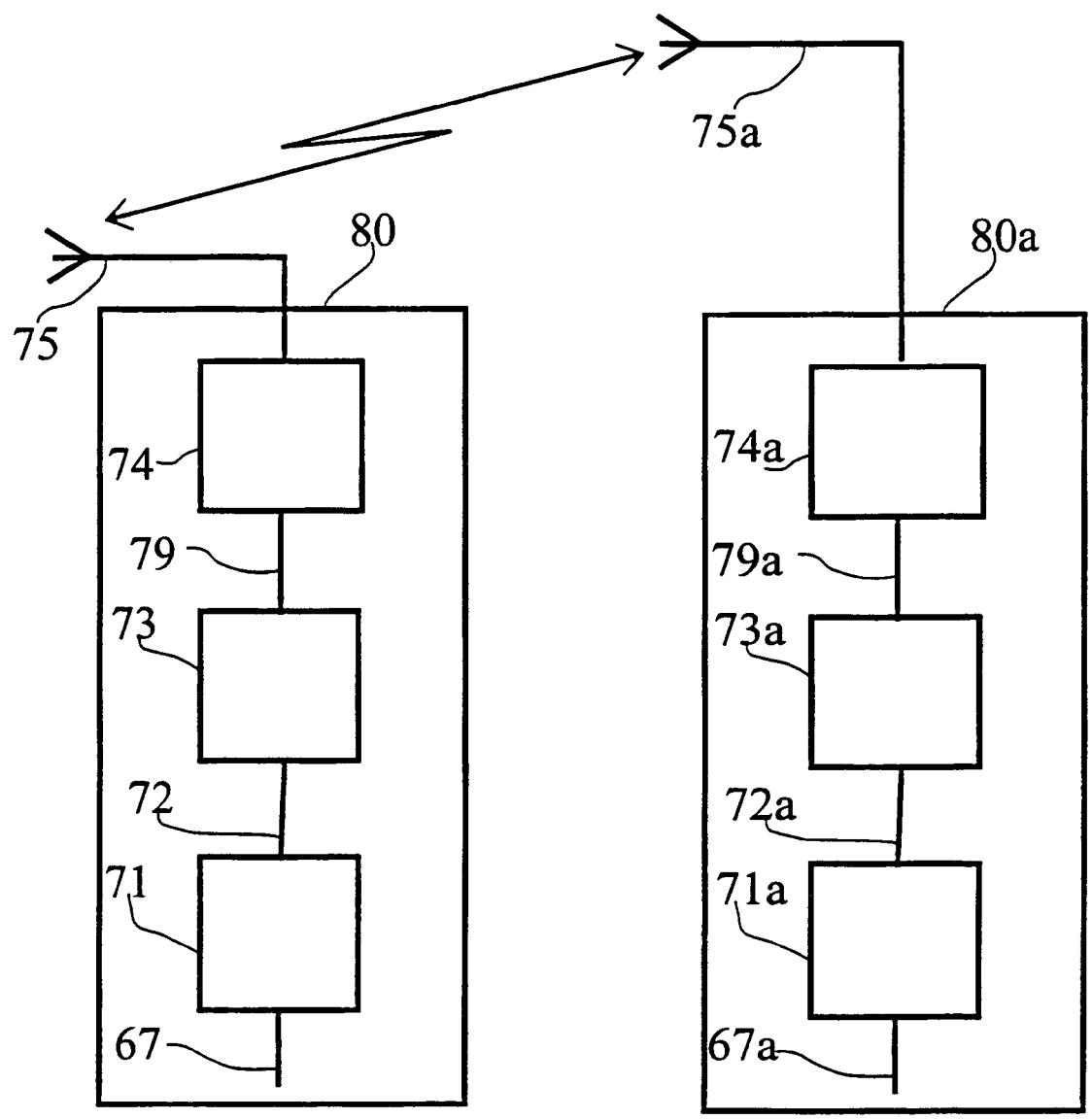
FIG. 24 shows in block diagram form and illustrates two radio units with parts essential for their function.

The unit 71 in FIG. 24 is the logic which converts data which is to be transmitted from the internal storage in a memory into a stream of bits which is to be transmitted by means of radio electronics. The signals 78 which connect together 73 and 74 consist of a data lead and a lead which clocks the flow of bits. These two leads, data and clock, can be used both for transmission and reception, however it is more common to have two independent pairs of signals, one for transmission and one for reception. There can be additional signals for handling the synchronization between the units 73 and 74. In order to set all parts in the modulator 73 and the amplifier/signal exchange 74 there are additional signals. What these are and how they are used depends on what type of modulator is used and on the construction of unit 74. As the components in the modulation/demodulation are not of importance for the utilization of the invention, this is not described in greater detail. This stream of bits is modulated to a radio signal in the unit 73 with a selected frequency, for example in the ISM band 2450 to 2500 MHz. What frequency and what modulation is selected is not of importance for the invention, but can be selected as required and according to what is available. The modulated signal then passes through the electronics 74 where the signal is attenuated or amplified in accordance with the schedule described in the invention. The selection of antenna for the transmission is also carried out here. In this example only one antenna 75 is shown in the figure, which in this case is used for the transmission. There can be several antennas in the equipment to choose between, depending on the signal strength and the direction of the transmitted electromagnetic field. The resulting antenna can also be such that it consists of two or more antennas which are operated by one amplifier or of one, two or more antennas which each have their own amplifier for operating the respective antenna.

The signal is transmitted from the antenna of the transmitter to the receivers. In the figure only one of the receivers is shown as all of the receivers have equivalent functions. Also on the receiver side only one antenna is shown but there can be several reception antennas which work one at a time depending on which antenna is optimal for the reception at the time. It can also be the case that the antennas are coordinated in such a way that the signals from two or more antennas are combined in order to obtain optimal reception conditions. The combination and choice of antenna can be made in order to amplify or attenuate the signal while at the same time discriminating unwanted signals in order to obtain optimal conditions for the whole system.

The signal then comes to the electronics which select the antennas and which comprise also amplifiers and any attenuation circuits which together with the antennas provide an optimal signal to the radio receiver. Here demodulation is carried out to a bit stream which corresponds to the signal 72 at the transmitter. The signal is thereafter stored in 71a from whence the processor can transfer the information to the indicated receiver, for example by transmission from the CAN bus via the CAN controller. It can be noted that the bit pattern at 73a does not need to be 100% identical to the pattern at 73 even though this is the case under optimal conditions. As the transmitted packet comprises check sums and redundancy it is possible to correct a certain amount of errors which have arisen between the transmitter and the receiver.

See also FIG. 6 and the appearance of the transmitted bits at the transmitter and the receiver and their time relationship.

In the upper part we have the bits which come from 71 on the data lead in 72 to 73 placed on a time axis. In the lower part we can see the same packet on a corresponding data lead 72a from 73a to 71a also placed on a time axis. The time axis is here related to a global time so it can be seen that the signal at 73a is delayed somewhat relative to the corresponding position of the bit stream at 73. This delay is caused by several components, partly in the leads where the signal is propagated at just under the speed of light and partly in the demodulation and in the connectors and the amplifier. Concerning the delays between 71 and the antenna, these can be measured in various conditions in cases where they vary with temperature or supply voltage and/or output power and selected setting of the different components. The delay between transmitter, antenna and receiver antenna can be determined by means of some form of external measurement if the distance is known.

At the global time G1 the unit 71 starts the transmission of bits from 73 to 74. In the case described there is first in the bit flow a pattern which the time function can recognise. The position of this is of less importance but the technical solutions and the need for communication which is required for the time setting can vary depending on the selected solution. How this time synchronization is carried out in detail is not of importance for the invention although it is essential that it is carried out with good precision. The more precisely this can be carried out the more effective a solution will be obtained. For the transmission the same electronics are suitably used as for the reception of the bits. These electronics, which are suitably located in 73, detect the pattern 76 and relate this pattern to the time G1 which in this example is called T1A. This time is to be made known to the receiver and the most effective way is that this time is placed in the same message as what it is related to. In the solution described, this time is placed in the transmitted bit pattern at 77. With a certain delay DT1 the information will reach 73a at the global time G2. In this unit we have the same electronics as in 73 in order to detect the pattern 76 and relate this pattern to the time G2 which is noted by the local time T2A. When the whole message has been received the module 2 can obtain information about the time 77 at which this packet is to be transmitted from module 1. This module can now adjust or relate its internal clock to the transmitted time. Now both modules have the same time base with the only difference that the module 2 has a time which is the time DT1 after the clock in module 1. By this simple method all the modules can be synchronized to a common base unit with an accuracy which is better than the delay between the time-transmitting module and the modules which are synchronizing themselves to this time.

By means of the unit now sending a message back to the clock controlling unit with the same procedure, the time synchronization can be made even more precise. The following equations are now obtained.

$$T1A = G1$$

T2A is set to T1A=G1 at the global time G1+DT1.

$$T2B = T2A + DIFFB$$

The local time at unit 2 when it transmits its message.

$$T2A = T1A + DIFFA$$

The local time at unit 1 when the message arrives.

If both modules have the same time base we have the following conditions.

$$DIFFA = DIFFB + DT1 + DT2.$$

From knowledge of electromagnetic propagation we find that DT1=DT2. If a major part of the delay comes from the internal electronics then this must be taken into account. This is, however, something that each unit can compensate for in accordance with some form of compensation table or function after measurement of the product.

By taking the difference between the local time and the transmitted time the following is obtained:

$$T2A - T2B = T1A + DIFFA - (T1A + DIFFB)$$
$$= T1A + DIFFB + \text{``*}DT1 - (T1A + DIFFB)$$

<==<

$$T2A - T2B = 2*DT$$

Figure 25:
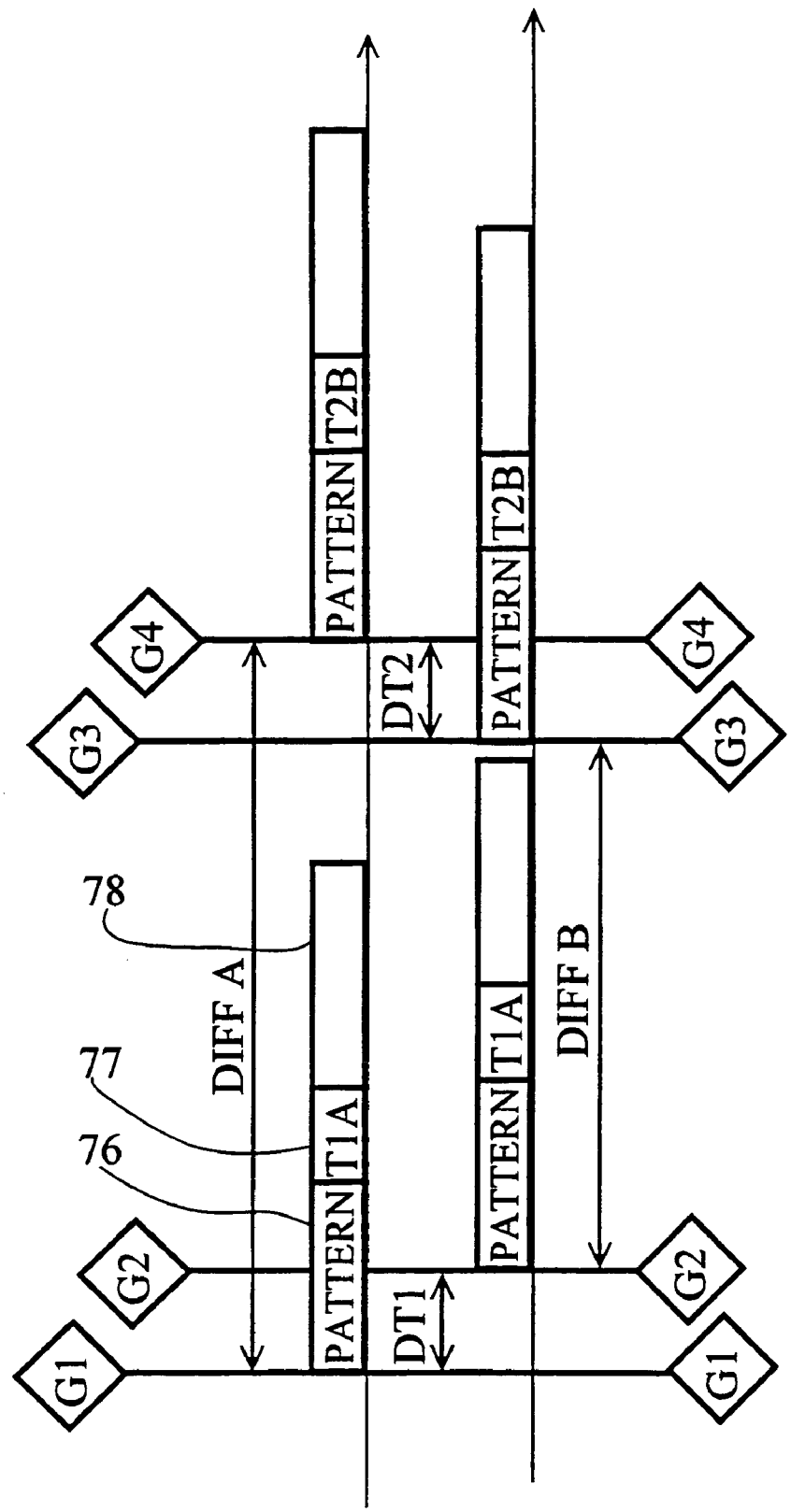
FIG. 25 shows in outline diagram form further examples of the appearance of transmitted digital signals (bits) and their appearance to the transmitter and receiver and their time relation.

This means that using this calculation unit 1 has now measured the unknown delay between unit 1 and unit 2 using the communication link. By transmitting this information to the other unit this can compensate its setting of the time so that its local clock can be related with great precision to the global time in the system. It should be noted that the process can be refined and implemented in various ways. The problem which then remains is to retain the synchronization of the time in the units incorporated in the system. Even though the clocks which are incorporated in the radio units have good precision and little drift, over a fairly long period of time they will diverge from each other. Even though the clocks have an accuracy of 25 ppm this will affect the time. In FIG. 25 an additional time period is indicated by 78. In FIG. 24 additional signals are indicated by 79, 79a and the connection point or connection signals are indicated by 80, 80a and an antenna unit by 75 corresponding to antenna 75a for module 2.

Figure 26:
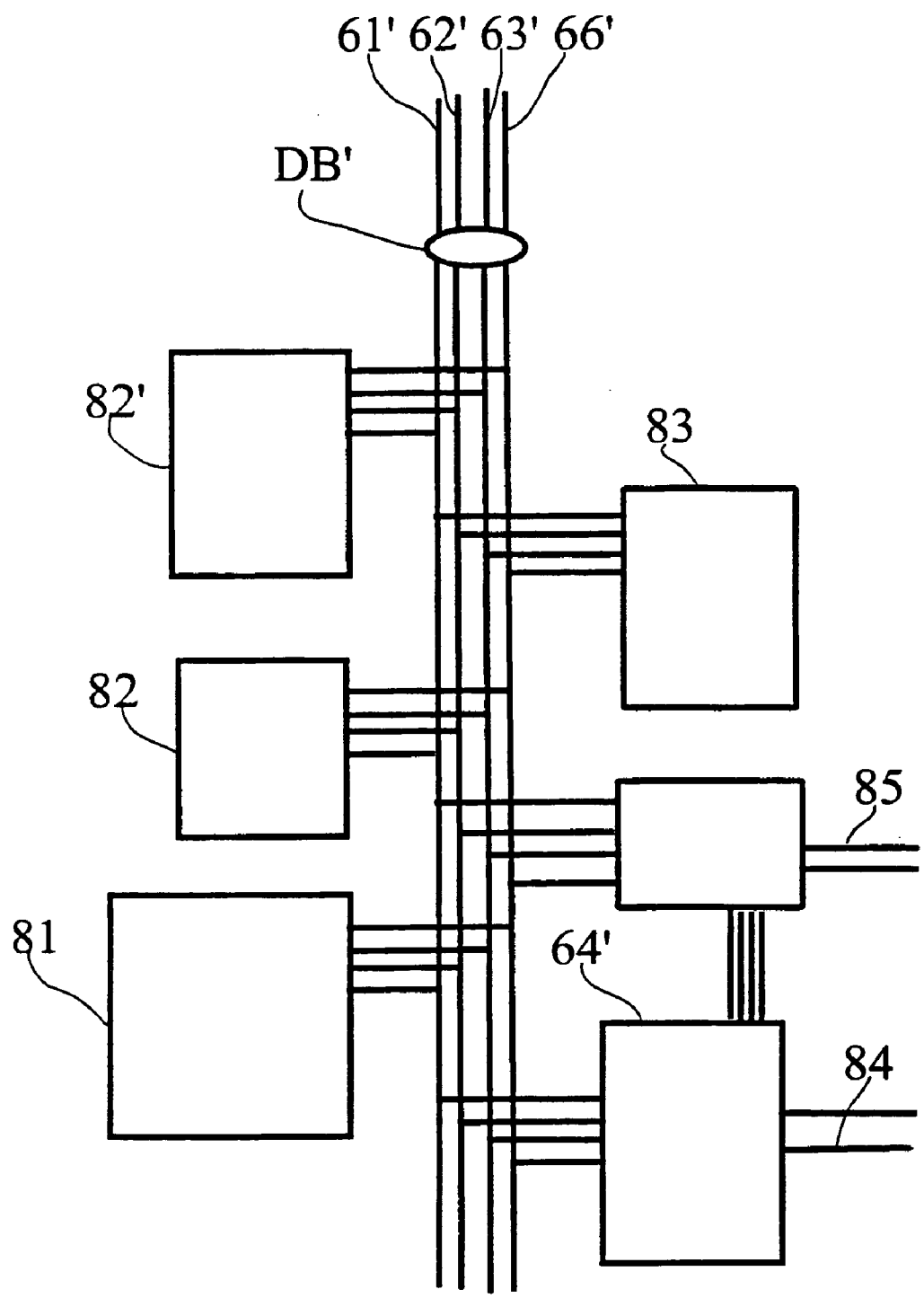
FIG. 26 shows in block diagram form the construction of a radio module.

See FIG. 26 which is a version of the embodiment according to FIG. 22. Corresponding units in FIGS. 22 and 26 have the same references which, however, are supplemented by the primary actors in FIG. 26.

The computer unit CPU is in this case indicated by 81 and a memory by 82. A RAM memory is indicated by 83. A connection cable is indicated by 84. A radio interface is indicated by 82'. All signals which are required to interconnect the various parts are called here a computer bus DB (DB').

The CAN controllers 64' can in this case describe the communication unit which exchanges information with other units using cable 84 and leads, for example ISO 11898. As described above it is not necessary for this type of connection to be CAN but it can also be Ethernet, Fieldbus Foundation, TTP (timed triggered protocol). In most cases these communication protocols can use electrical signals as well as optical or other electromagnetic field propagation to transmit the information signals from one control unit to another.

The information can be transmitted from one to all which is common in CAN where receiving units by means of selection choose the information which they are to forward to other parts in the system. The transmission can also be such that several units can transmit at the same time by means of different types of modulation which makes it possible to obtain different channels and the receivers can then by means of settings choose the channel on which they expect the information to arrive. This makes it possible for several to transmit at the same time on a part of the common medium, and for the units to carry out a rough sorting of all the information which is available on the transmission medium by selecting their part of the medium.

In FIG. 26 there is also a unit 84 which is a power supply 84 to the units concerned via leads 85, for example unit 64'. The supply voltage in cars and mobile vehicles is normally 12 or 24 volts. This power supply can run in parallel with the communication leads or can be separate. Normally the unit 84 is so constructed that it can handle many different supply voltages from 4 volts up to 40 volts. In many cases the supply is from a battery or from solar cells when the radios are utilized in such locations that it is not possible or desirable to run leads to the equipment, for example on account of the danger of explosion. DB' then ensures that the external supply is adapted to the internal requirement. The various parts of the unit are supplied with electrical current and a common voltage for this supply is 3.3 volts, but 5 volts can also occur. For supplying the internal logic and computer parts there can be voltages of 1.8 volts and in the future it can be expected that there will be even lower voltages. Higher voltages can also be found in the radio part in order to obtain higher power for the transmitted radio signal or in order for the selected type of circuit to operate in an optimal way. Certain circuits can also require negative voltages in order to function, which can be generated by various techniques internally in the circuit or can be obtained from 84. The unit can therefore be caused to produce one or more different or identical voltages which are supplied to one or more of the units connected to the bus DB' via the leads in DB'. Voltages which are supplied to the different units can thereafter be converted to other voltage levels in the different circuit units. See also FIG. 22.

Figure 27:
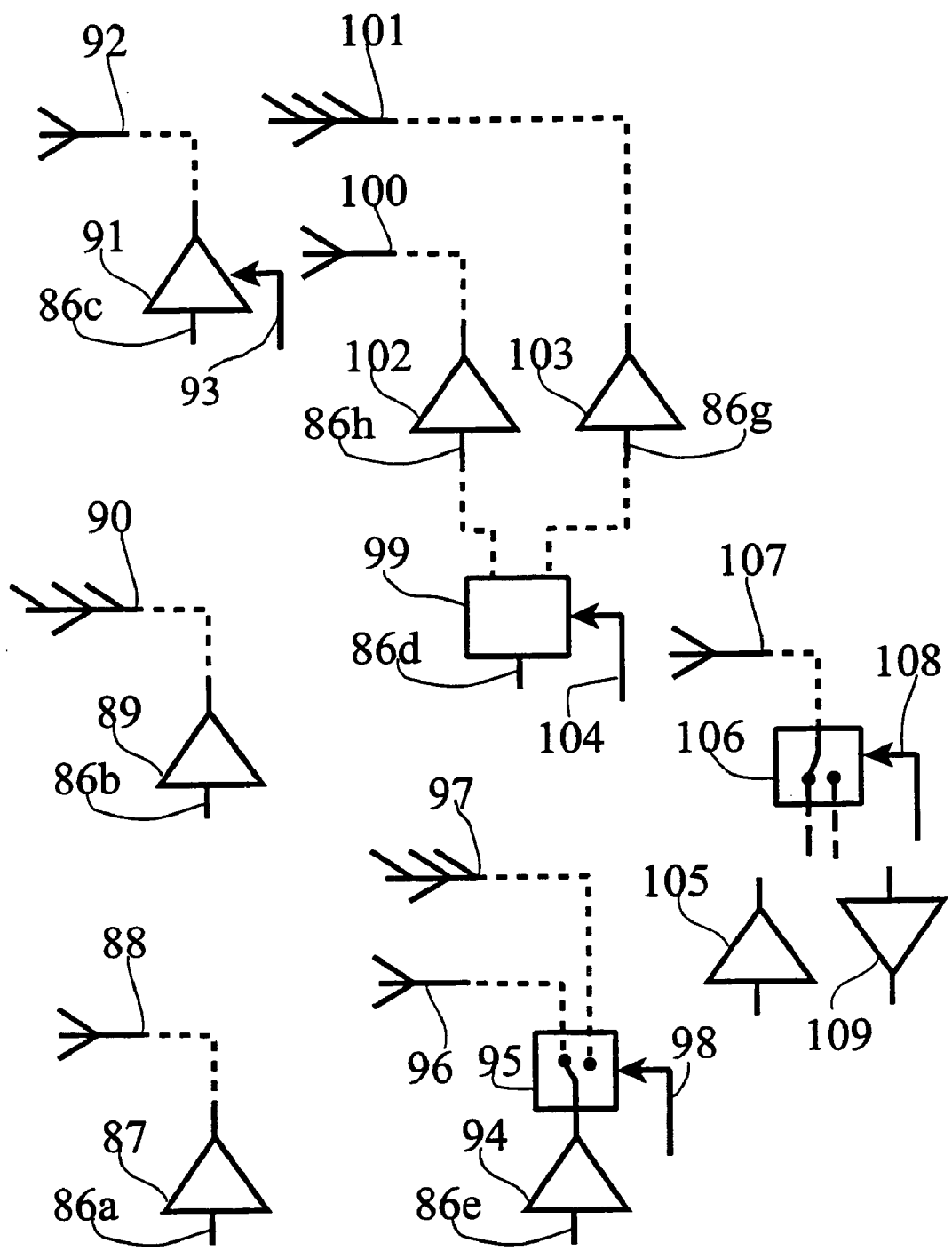
FIG. 27 shows in outline diagram form the transmitter and receiver parts in connection with the available radio energy.

FIG. 27 concerns how the time is synchronized between units in the system and how the common medium is to be used without the incorporated units causing interference for each other. This can be controlled using two parameters, namely the energy in the radiating electromagnetic field and how this electromagnetic energy is distributed geometrically. The energy can be adjusted using an amplifier with controllable amplification. The geometric direction of the dispersion of the energy is determined principally by the design of the antenna. By selecting or combining different amplifiers and antennas, it is possible to obtain great variation and definition of the dispersion area of the radio energy and the energy levels which are obtained at different points around the transmitter. As the transmission and reception of electromagnetic radiation are reciprocal, a corresponding combination of antennas and input amplifiers can make it possible to cover different areas for the reception of radio signals.

FIG. 27 describes in detail parts which are incorporated in an overall connection as follows. A signal which arrives in these parts is a modular signal which is to be transmitted into the ether, here indicated by 86*a*, 86*b*. In this last part the energy and the direction of the energy are adjusted. In the simpler case there is an amplifier 87 with an antenna 88 of the omnidirectional type, see also 89, 90 and 91, 92. By an omnidirectional antenna is meant in this case an antenna which distributes the energy evenly in a circle of 360 degrees in one plane. A simple adjustment in this case is that it is possible to replace the antenna 88 by different types of antennas with different types of dispersion areas. This is exemplified by 89 and 90, where 89 is a fixed amplifier and 90 is an antenna which provides different transmission of energy in different directions. The replacement or adjustment of the antennas 88 and 90 is something which is carried out manually and not something that can be automated. This is what is normal today for different types of radio installations. The invention can nevertheless be used in such equipment where the allocation of the medium is different at different times. By selecting different antennas 88 and 90 with different dispersion areas it is possible to obtain an optimal allocation of resources for the whole system. In addition this can be combined with amplifiers 87 or 89 with different amplifications. These combinations are fixed after the setting has been carried out, but they can, however, be adjusted and optimized as required in the system concerned which, in combination with the allocation of the ether in time, can provide a sufficiently good system.

The next example shows an amplifier 91 with a fixed antenna 92. In this case the amplifier can be adjusted to obtain different energy in the area covered by the antenna. The control of the amplifier is carried out using the signal 93 which can be discrete with two or a few possible choices of analogue signal. This signal can be controlled in a suitable way from the processor or the unit which comprises the schedule which specifies the setting, which means that the unit works in the system in the specified way. Also in this case the antenna 92 can be of a type which is omnidirectional with equal radiation in all directions or one which distributes the radiated energy differently in different directions. When the radiation is described as evenly divided this applies in a two-dimensional plane which has a certain extent in the third dimension, that is all the receivers need to be located in one plane. The description can be increased to include a more complex three-dimensional extent, but in most cases the radiation is located at ground-level, for which reason it can be simplified into a plane model.

By adjusting the power transmitted from the amplifier 91 at the antenna 92 it is possible to obtain different transmitted powers. In this way it is possible to make adjustments so that the power reaches the first receiver which it is wished to reach. The other receivers which are located within an area receiving so little power from this transmitter that they are not subject to interference can simultaneously receive transmissions from other transmitters which transmit with the same modulation. It is necessary for these other transmitters to have their transmitted energy at such a level that they do not affect or cause interference to the reception in the first receivers. Also in this case antennas on transmitters and/or receivers can be such that they transmit and receive the radio energy differently in different directions in relation to the units located in the system. During reception it is the relative power from different transmissions the whole time which is important; as long as the signal which is to be received is sufficiently more powerful than all other signals then all other signals will be interpreted as noise. It is important to ensure that the signal to noise ratio is such than the noise does not interfere with the signal. It can also be noted that it is not only the antennas which affect how the radiated energy is distributed in its surroundings. Both stationary and movable objects in the surroundings can also affect how the energy is distributed. This must be taken into account when the conditions are being set which are to apply for the system. The amplifier 92 can be of the type MGA-72543 from Agilent which can simply vary the output power by 10 dB by means of adjustment of the bias current.

In the next example at the output there is an amplifier 94 and after this there is a switch 95 using which it is possible to select one of two antennas 96 and 97 by means of the control signal 98. The two antennas can be of different types, an omnidirectional antenna 96 and an antenna 97 which directs the radiated energy so that there is more in certain directions and less in others. By using different transmission antennas for different transmissions, different coverage areas can be selected for the transmission in the system. Also in this case the amplifier 94 can be of such a type that the power which it transmits can be adjusted. In the example we have only two antennas to select between, but of course there can be more than two to select between.

Another more complex example has a unit 99 which divides the input signal 86*b* into two signals. These two signals, which can be in phase or out of phase by a particular number of signal degrees, then go to the antennas 100 and 101 directly or via amplifiers 102 and 103. By combining two or more antennas for transmission in this way, it is possible to vary how the total dispersion energy is dispersed from the units. If it is possible to adjust the phase between the signals which go to the two or more antennas using one or more digital or analogue signal(s) 104, the dispersion of the signal can be adjusted dynamically so that at different times there are different dispersions in order in this way to obtain different degrees of coverage for the transmission. Using variable amplification gives the additional ability to control how the signal is dispersed in different directions and with different strengths of the signal. The antennas 100 and 101 can be omnidirectional antennas as well as antennas which are directional.

The invention is not restricted to these basic examples but can consist of combinations of the abovementioned connections. It is characteristic of this invention that it is possible to ensure how the transmission energy is dispersed within the radio system. By means of this it is possible to ensure that two units which transmit simultaneously with the same modulation do not cause interference to the receiver(s) which are to receive the signals concerned. If in addition it is possible to control the output power and the dispersion of this output power in accordance with the solutions described here and combinations thereof, it is possible to adapt the area which the transmission covers in such a way that a maximal transmission capacity can be obtained between the different units within the system.

As electromagnetic transmission is reciprocal, there can be a corresponding arrangement at the receiving part. All that needs to be done is to change the direction of the amplifiers. This can be seen from the input connection of the output amplifier 105 which via a switch 106 transmits the signal on antenna 107. For reception the switch 106 is changed over by the signal 108 so that the received signal at the antenna 107 now goes to the reception amplifier 109 which in turn sends the signal to the demodulator. In this example, in order for the invention to work, all settings which need to be controlled must be controllable by the unit which comprises the schedule of the settings which apply for each transmission or reception. The schedule shows the setting which it is to use so that it performs its function in the system in which it is incorporated in the most optimal way.

The invention is not restricted to the embodiments described above as examples, but can be modified within the framework of the following patent claims and the concept of the invention.

What is claimed is:

1. A network having a plurality of nodes forming a distributed control system for a plurality of machines with pre-established communication connections between said nodes comprising:
    a system for pre-establishing communications between a plurality of nodes by assigning unique transmit and receive time slots to said plurality of nodes and for placing other nodes in a receive only state;
    a radio transmitter and receiver at each node for receiving information from other nodes and transmitting information to other nodes via radio communications during transmit and receive time slots assigned to said node;
    a local clock; and
    a connection device connected to said local clock for enabling said transmitter and receiver during said time slots wherein each of said plurality of nodes is a transmitting node and transmits information to a pre-identified receiving node during a time said pre-identified node has a corresponding receive time slot, and receives information during a time slot in which another of said nodes is transmitting information, whereby communications are established between nodes needing information from other nodes, and said other nodes remain in a receive only state.

2. The network according to claim 1, further comprising a digital cable link interconnecting at least some of said nodes and said system for exchanging information with said nodes.

3. The network according to claim 1, wherein said radio transmitter of said nodes transmits information at a power level as a function of time.

4. The network according to claim 1, wherein said system includes a control node to reassign transmit and receive time slots to said nodes.

5. The network according to claim 4, wherein said system reassigns said transmit and receive slots based on conditions reported by said nodes to said control node.

6. The network according to claim 1, wherein each node further comprises means to control the direction of transmission from each node.

7. The network according to claim 3, wherein said power level is selected so that said signal is received at a receiving node at a predetermined level above a noise threshold of said node receiver.

8. The network according to claim 7, wherein nodes which are located within the coverage of a first node which do not need to receive or transmit to said first node have a transmit state deactivated.

9. The network according to claim 5, wherein said system provides a global time clock for synchronizing said local clocks.

10. The network according to claim 7, wherein said nodes measure the signal level of a transmission from a transmitting node and report said signal level to said system which determines time slots for said nodes from said signal level.

11. The network according to claim 1, further comprising nodes outside of the coverage area of said transmitting node and said receiving node which communicate with each other at the time nodes within the coverage area are communicating with each other.

12. The network according to claim 10, wherein nodes which are outside the coverage areas of the first node record a time period where signals have not been received or which have been received with interference, and report said periods to said system, and are used by said system to identify a time for transmission of said nodes outside of said coverage area.

13. The network according to claim 1, wherein a node can change its direction of transmission to communicate with a different node.

14. The network according to claim 1, comprising a mobile node in an area of coverage of said transmitting and receiving node.

15. A network having a plurality of nodes forming a distributed control system for a plurality of machines comprising:
    a system which pre-establishes communication connections between nodes by assigning unique transmit and receive time slots to each node;
    radio transmitter and receiver at each node for receiving information from other nodes and transmitting information to other nodes via radio communications, a first set of said nodes being assigned to communicate in a first geographic region, and a second set of said nodes being assigned to communicate in a second geographic region;
    a local clock for identifying the time of transmission and receiving states of the node in time slots previously assigned to said nodes;
    a connection device for enabling said transmitter and receiver at said identified time wherein said node transmits information to a pre-identified node in a respective geographic region during a time said pre-identified node has a corresponding receive state, and receives information during a state in which another of said nodes is transmitting information, whereby communications are established between pre-identified nodes needing information from other nodes in the same region said connection device placing certain of said nodes in a receive state only, and
    means to switch the transmit and receive directions of a node in said second region to communicate with a node in said first region.

16. A network having a plurality of nodes with pre-established communication connections between said nodes for controlling a plurality of machines comprising:
    a system for pre-establishing communications between said nodes by assigning unique transmit and receive time slots to said nodes;
    radio transmitter and receiver at each node for receiving information from other nodes, and transmitting information to other nodes via radio communications, a first set of said nodes being pre-assigned transmit and receive time slots to communicate with pre-identified nodes in a first geographic region and a second set of nodes being pre-assigned transmit and receive time slots to communicate with pre-identified nodes in a second geographic region at least one of said nodes operating in a receive state only;
    a local clock for identifying the respective transmit and receive time slots of each node;
    a connection device for enabling said transmitter and receiver at said identified time slots wherein a first node transmits information to a second, pre-identified node in a respective geographic region during a time slot a corresponding to a receive time slot of said second node, and said first node receives information during a time slot in which another of said nodes is transmitting information, whereby communications are established between pre-identified nodes needing information;

signal detection apparatus at another of said nodes to detect said first node transmission; and means for forwarding said detected transmission from said another node to said second node when a signal level of said detected transmission is not sufficient to directly communicate with said second pre-identified node.

17. The network according to claim 16, wherein said another of said nodes reports said signal level information to the system for pre-establishing communications between said another node said second node, whereby said transmission from said first node is forwarded to said second node.

18. The network according to claim 16, further comprising nodes which only receive information from a transmitting node.

19. The network according to claim 18, wherein said system which pre-establishes communication connections has a control node which can receive signal level information from said receive only node, and can re-assign communication connections based on said received information.

20. The network according to claim 19, wherein said control node establishes a global time clock which is used to synchronize said local clock at each node.

21. The network according to claim 19, further comprising mobile nodes which move in said first region and which have navigation systems to determine their position and which report their position to said control node.

22. The network according to claim 19, further comprising mobile nodes in said first geographic region which have transmit signals monitored by other nodes which determine the position of said mobile nodes based on the time or arrival of said transmissions.

23. The network according to claim 19, wherein said mobile nodes position are determined from signal information received by nodes which have a fixed position.

* * * * *